United States Patent
Seo et al.

(10) Patent No.: US 9,319,823 B2
(45) Date of Patent: Apr. 19, 2016

(54) APPLICATION CONTROL METHOD AND APPARATUS FOR MOBILE TERMINAL, EARPHONE DEVICE AND APPLICATION CONTROL SYSTEM

(71) Applicant: Samsung Electronics Co., Ltd., Suwon-si, Gyeonggi-do (KR)

(72) Inventors: Jaemin Seo, Suwon-si (KR); Hyejeon Jung, Seoul (KR); Eunjoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 14/186,874

(22) Filed: Feb. 21, 2014

(65) Prior Publication Data

US 2014/0242964 A1 Aug. 28, 2014

(30) Foreign Application Priority Data

Feb. 26, 2013 (KR) .................. 10-2013-0020585

(51) Int. Cl.
*H04M 3/00* (2006.01)
*H04W 4/00* (2009.01)
*H04M 1/60* (2006.01)

(52) U.S. Cl.
CPC ............ *H04W 4/001* (2013.01); *H04M 1/6058* (2013.01); *H04M 2250/12* (2013.01)

(58) Field of Classification Search
USPC ......................................... 455/418
See application file for complete search history.

(56) References Cited

U.S. PATENT DOCUMENTS

| 2007/0076897 | A1 | 4/2007 | Philipp |
| 2009/0160645 | A1 | 6/2009 | Duron et al. |

FOREIGN PATENT DOCUMENTS

| KR | 10-2006-0106299 A | 10/2006 |
| KR | 10-2007-0009823 A | 1/2007 |
| KR | 10-2010-0065536 A | 6/2010 |
| KR | 10-2012-0051898 A | 5/2012 |

*Primary Examiner* — Joel Ajayi
(74) *Attorney, Agent, or Firm* — Jefferson IP Law, LLP

(57) ABSTRACT

The present disclosure relates to controlling an application in a mobile terminal. The present disclosure includes an application control method and apparatus for a mobile terminal, earphone device, and application control system. The method for application control in a mobile terminal may include detecting connection of earphones having a sensor for sensing earphone wearing, sending, upon detection of earphone connection, an interrogation signal to the sensor of the earphones, receiving a response signal, corresponding to the interrogation signal, from the earphones, determining whether the earphones are worn by a user on the basis of the response signal, and controlling, when the earphones are not worn, an application being executed to stop output of an audio signal to the earphones.

29 Claims, 18 Drawing Sheets

APPLICATION CONTROL METHOD AND APPARATUS FOR MOBILE TERMINAL, EARPHONE DEVICE AND APPLICATION CONTROL SYSTEM

CROSS-REFERENCE TO RELATED APPLICATION(S)

This application claims the benefit under 35 U.S.C. §119(a) of a Korean patent application filed on Feb. 26, 2013 in the Korean Intellectual Property Office and assigned Serial No. 10-2013-0020585, the entire disclosure of which is hereby incorporated by reference.

TECHNICAL FIELD

The present disclosure relates to control of a mobile terminal. More particularly, the present disclosure relates to an application control method and apparatus for a mobile terminal, earphone device and application control system wherein an application running on the mobile terminal is intelligently controlled according to a usage state of the earphone device.

BACKGROUND

Mobile terminals supporting communication have entered into widespread use due to their small size and ease of portability. Recently, increased touchscreen sizes, and hardware and software improvements, enabling digital content diversification, have dramatically accelerated popularization of mobile terminals.

An earphone device may serve as an accessory for a mobile terminal. The user of a mobile terminal may listen to an audio signal through an earphone device by plugging the earphone device into the mobile terminal. While the earphone device is plugged into the mobile terminal, the user may detach the earphone device from their ears in various situations. In this case, the user may fail to receive an audio signal reproduced through the earphone device unless an audio control action is deliberately performed before detachment of the earphone device. That is, the user may involuntarily miss some portion of audio content. Accordingly, there is a need for an improved apparatus and method for intelligently using an earphone device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an application control method and apparatus for a mobile terminal, earphone device and application control system wherein various functions of the mobile terminal are intelligently provided according to whether the earphone device is worn by the user.

Another aspect of the present disclosure is to provide an application control method and apparatus for a mobile terminal, earphone device and application control system wherein non-powered sensors are used to monitor wearing of the earphone device while minimizing unnecessary power consumption.

In accordance with an aspect of the present disclosure, a method for application control in a mobile terminal is provided. The method includes detecting connection of earphones having a sensor for sensing if the earphone is being worn, sending, upon detection of earphone connection, an interrogation signal to the sensor of the earphones, receiving a response signal corresponding to the interrogation signal from the earphones, determining whether the earphones are worn by a user on the basis of the response signal, and controlling, when the earphones are not worn, an application being executed to stop output of an audio signal to the earphones.

In accordance with another aspect of the present disclosure, an apparatus for application control in a mobile terminal is provided. The apparatus includes an earphone interface configured to detect connection of earphones having a non-powered sensor for sensing if the earphone is being worn, a reader module configured to send an interrogation signal to the earphones and to receive a response signal emitted by the non-powered sensor, and a control unit configured to perform a process of sending, upon detection of earphone connection, an interrogation signal to the sensor of the earphones, receiving a response signal corresponding to the interrogation signal, analyzing the response signal, and controlling, when the earphones are not worn, an application being executed to stop output of an audio signal to the earphones.

In accordance with another aspect of the present disclosure, an earphone device is provided. The earphone device includes a head section configured to output an audio signal, a non-powered sensor having an antenna, arranged at the head section, connected between ground lines of the earphone device, configured to receive an interrogation signal from an external device, and to output a response signal indicating wearing or non-wearing of the head section on the ear, and a case configured to enclose the non-powered sensor and head section.

In accordance with another aspect of the present disclosure, an application control system apparatus is provided. The application control system includes an earphone device and a mobile terminal. The earphone device includes a head section configured to output an audio signal, a non-powered sensor having an antenna, arranged at the head section, connected between ground lines of the earphone device, configured to receive an interrogation signal from an external device, and to output a response signal indicating wearing or non-wearing of the head section on the ear, and a case configured to enclose the non-powered sensor and head section. The mobile terminal may include an earphone interface configured to detect connection of the earphone device, a reader module configured to send an interrogation signal to the earphone device and to receive a response signal emitted by the non-powered sensor of the earphone device, and a control unit configured to perform a process of sending, upon detection of earphone connection, an interrogation signal to the sensor of the earphone device, receiving a response signal corresponding to the interrogation signal, analyzing the response signal, and controlling, when the earphone device is not worn, an application being executed to stop output of an audio signal to the earphone device.

According to the present disclosure, in the application control method and apparatus for a mobile terminal, earphone device and application control system, non-powered sensors are used to monitor wearing of the earphone device so as to accurately determine whether the earphone device is worn without unnecessary power consumption.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
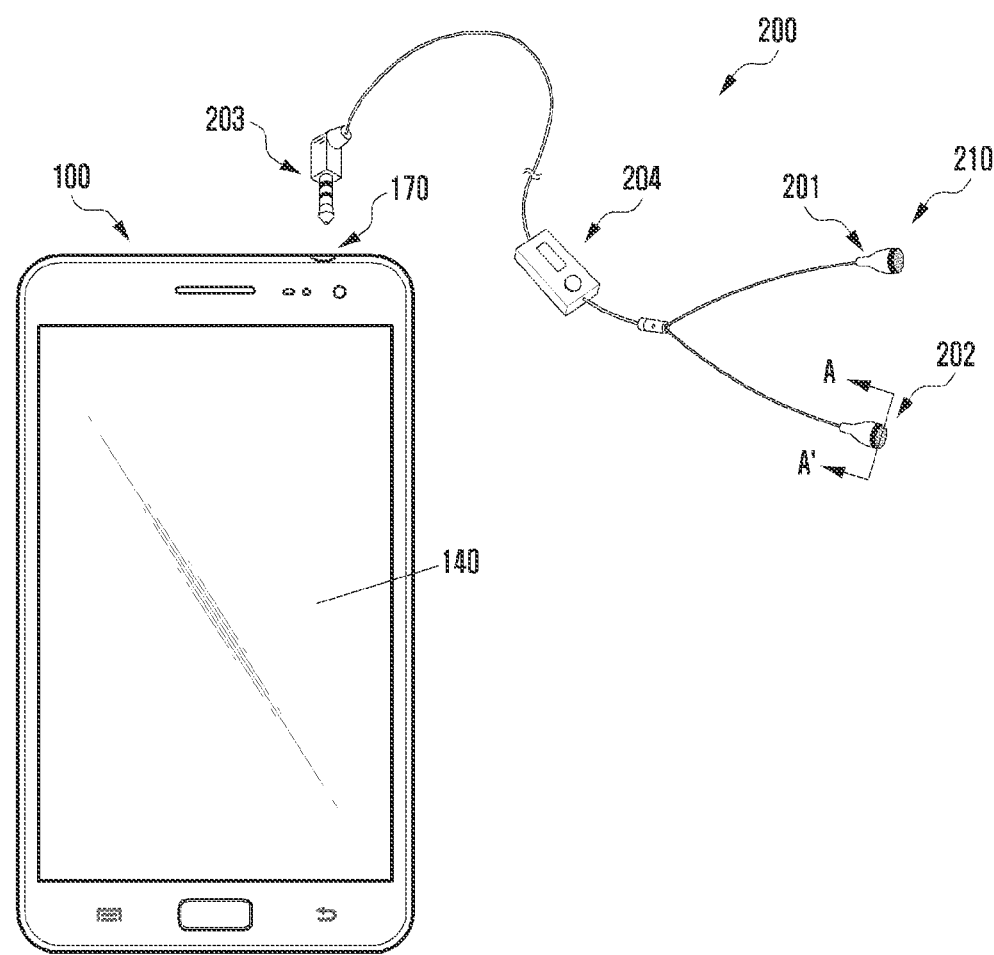
FIG. 1 illustrates an application control system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the drawings, some elements are exaggerated or only outlined in brief, and thus may be not drawn to scale. The present disclosure is not limited by relative sizes of objects and intervals between objects in the drawings.

In the description, the word "installation" or "connection" may be used to refer to a state wherein the earphone device is plugged in to the earphone interface of the mobile terminal. The word "uninstallation" or "disconnection" may be used to refer to a state wherein the earphone device is separated from the earphone interface of the mobile terminal. The word "wearing" may be used to refer to a state wherein the earphone device is inserted into the ears. The word "non-wearing" or "detachment" may be used to refer to a state wherein the earphone device is detached from the ears.

FIG. 1 illustrates an application control system according to an embodiment of the present disclosure.

Referring to FIG. 1, an application control system 10 may include a mobile terminal 100 and an earphone device 200 having non-powered sensors 210 for application control.

In the application control system, user functions of the mobile terminal 100 may be adaptively controlled in accordance with a state wherein the earphone device 200 having non-powered sensors 210 is connected to the mobile terminal 100, a state wherein earphone heads 201 and 202 of the earphone device 200 at which the non-powered sensors 210 are respectively arranged are worn by the user, or a state wherein the earphone device 200 having non-powered sensors 210 is disconnected from the mobile terminal 100. For example, in the application control system 10, the non-powered sensors 210 arranged at specific portions of the earphone heads 201 and 202 enable distinction between a state wherein the earphone device 200 is worn by the user and a state wherein the earphone device 200 is not worn by the user. The application control system 10 may distinguish between the earphone wearing state and the earphone non-wearing state so as to adaptively control functions of the mobile terminal 100, enhancing effectiveness of the mobile terminal 100. The application control system 10 may determine whether the earphone device 200 is worn without using separate sensing power by means of the non-powered sensors 210 arranged in the earphone device 200. Hence, the application control system 10 may adaptively control functions of the mobile terminal 100 through effective power usage and management.

The mobile terminal 100 includes an earphone interface 170 into which the earphone device 200 may be inserted. When the earphone device 200 is inserted into the earphone interface 170, the mobile terminal 100 may support output of an audio signal through the earphone device 200. For example, the mobile terminal 100 may output an audio signal to the earphone device 200 when the earphone device 200 is plugged in to the mobile terminal 100, and may output an audio signal to an internal speaker when the earphone device 200 is not plugged in. Here, the mobile terminal 100 may control audio signal output adaptively according to wearing or non-wearing of the earphone device 200 and may control various user functions according to wearing or non-wearing of the earphone device 200. Usage control of the mobile terminal 100 is described in more detail later with reference to the drawings. Individual components of the mobile terminal 100 and functions thereof, enabling monitoring of the wearing state of the earphone device 200 and controlling functions correspondingly, are described with reference to FIGS. 4 to 6. Various examples of function control according to the state of wearing of the earphone device 200 are described in more detail with reference to FIGS. 7 to 13.

The earphone device 200 is inserted into the earphone interface 170 of the mobile terminal 100 and outputs an audio signal of the mobile terminal 100. As shown, the earphone device 200 includes an earphone jack 203 insertable into the earphone interface 170 of the mobile terminal 100, an ear microphone 204, earphone heads 201 and 202, and a cable interconnecting these components. The earphone jack 203 has a structure matching the earphone interface 170 and may be a 4-pole jack when the ear microphone 204 is included. When the ear microphone 204 is not included in the earphone device 200, the earphone jack 203 may be a 3-pole jack. For example, as the non-powered sensors 210 are arranged in the earphone heads 201 and 202, when the earphone heads 201 and 202 are worn by the user, the earphone device 200 may provide a non-powered sensor response signal, which is a result of modulating a non-powered sensor interrogation signal according to physical characteristics of the non-powered sensors 210 changing with nearby surroundings, thereby enabling the mobile terminal 100 to identify the state of wearing of the earphone heads 201 and 202. Next, a description is given of an arrangement and configuration of the non-powered sensor 210.

Figure 2A:
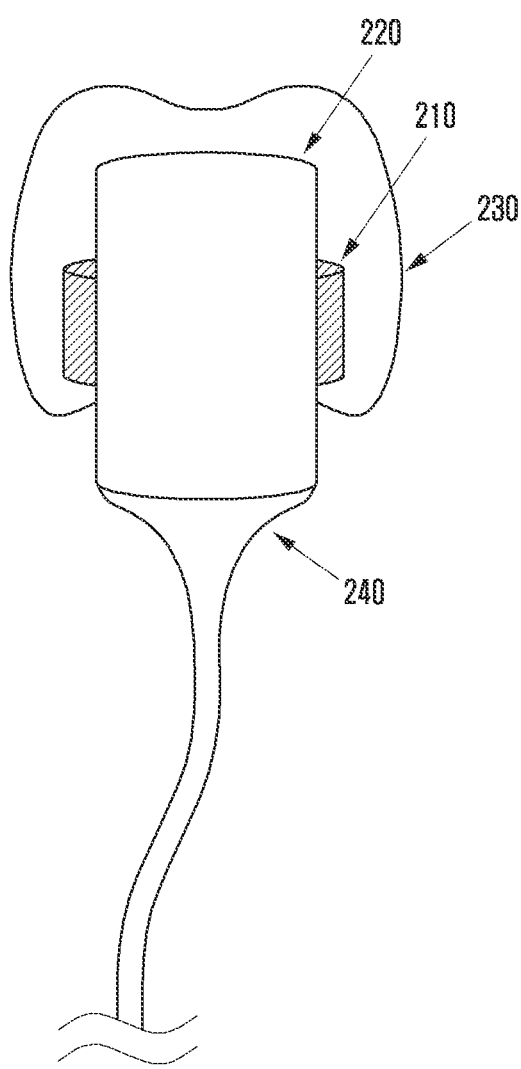
FIGS. 2A, 2B, 2C, and 2D illustrate various structures of an earphone head of an earphone device, such as the earphone device shown in FIG. 1, according to an embodiment of the present disclosure.

FIGS. 2A to 2D illustrate various structures of an earphone head of an earphone device, such as the earphone head 201 or 202 in the earphone device 200 shown in FIG. 1, according to an embodiment of the present disclosure. For example, FIG. 2A is a sectional view of the earphone head 201 or 202 taken along the section line A-A' of FIG. 1 according to an embodiment of the present disclosure.

Referring to FIG. 2A, the earphone head 201 or 202 is composed of a head section 220, a non-powered sensor 210 and a case 230, and the head section 220 is linked with a cable 240.

The head section 220 amplifies an audio signal provided through the cable 240 and outputs the amplified audio signal. The head section 220 has a size and shape suitable for wearing at the ear. The head section 220 may have a cylindrical shape made of reinforced plastics, epoxies or other materials capable of providing a desired level of hardness. The lower end of the head section 220 is fixedly linked with the cable 240 and the upper end thereof may have at least one tone hole to output an amplified audio signal.

The case 230 is a structure that encloses the head section 220 at which the non-powered sensor 210 is arranged. The case 230 as a member contacting with the ear may be made of materials that prevent a feeling of irritation. For example, the case 230 may be made of elastic materials based on rubber, latex or polyurethane or cotton based materials. For example, the case 230 may be configured to enclose the non-powered sensor 210 arranged at the head section 220 so that the non-powered sensor 210 may sense specific changes occurring in the external physical environment. The case 230 may also be configured so that a tone hole formed at the head section 220 is exposed.

The non-powered sensor 210 is placed at a portion of the outer wall of the head section 220 and has a state corresponding to the external physical environment. For example, the non-powered sensor 210 may have a physical state corresponding to temperature and transition to another state in response to a change in temperature. The non-powered sensor 210 may have a physical state corresponding to the presence of pressure and transition to another state in response to a change in pressure. In addition to temperature and pressure, the non-powered sensor 210 may have different physical states corresponding to vibration, a change in acceleration, or a change in the distance to a reader module. The non-powered sensor 210 may be a Surface Acoustic Wave (SAW) sensor or the like.

Figure 2B:
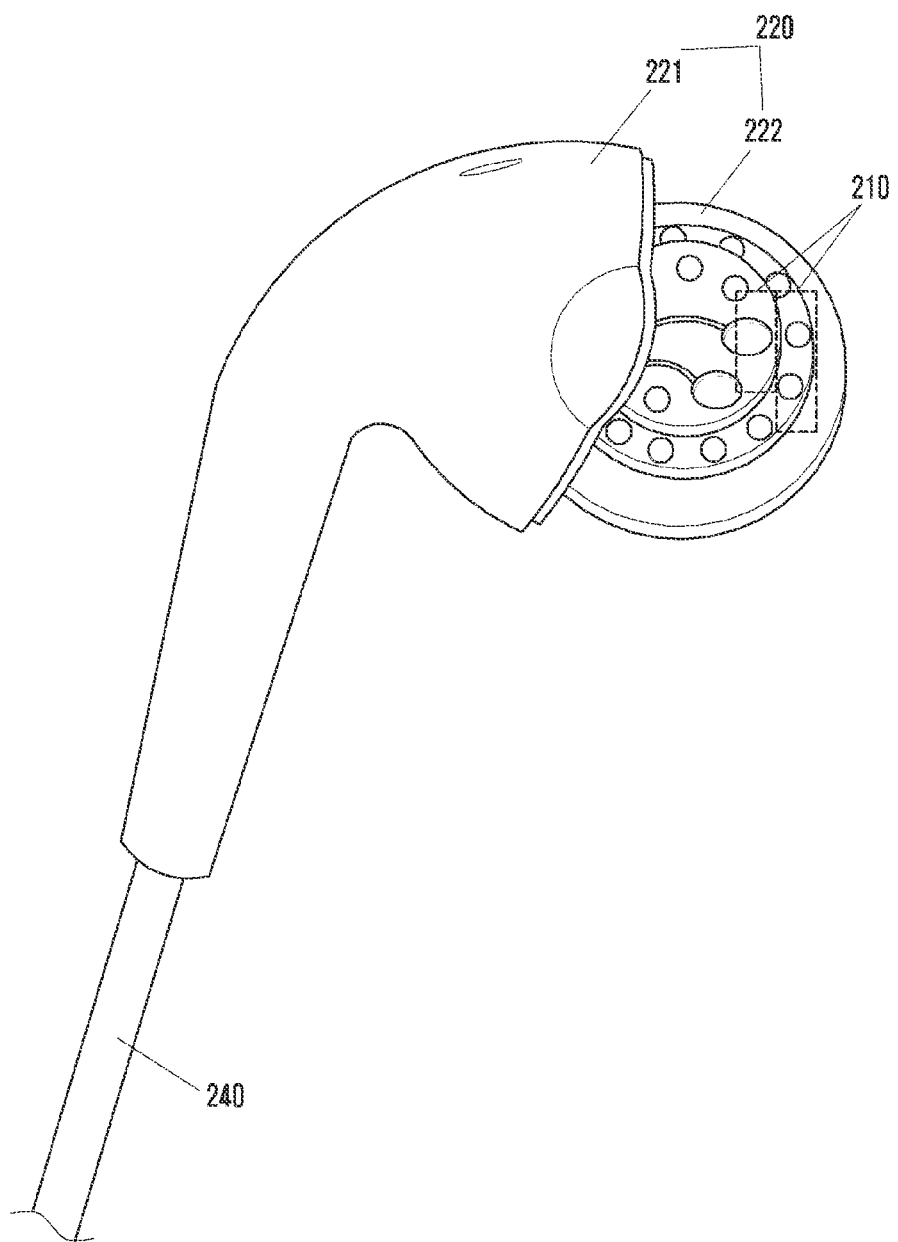

FIG. 2B illustrates another arrangement of the non-powered sensor 210 in the earphone head 201 or 202 according to an embodiment of the present disclosure.

Referring to FIG. 2B, in the earphone head 201 or 202, the head section 220 is composed of a body part 221, which may be made of injection molded plastic and coupled to a cable 240, and a sound output part 222 of a disk-shape coupled with the body part 221. The sound output part 222 may be fixedly attached to an opening region of the body part 221 with an adhesive. As shown, the non-powered sensor 210 may be composed of one or more sensing elements arranged at the bottom of the sound output part 222. The non-powered sensor 210 in FIG. 2B is composed of two sensing elements arranged at the bottom of the sound output part 222.

Figure 2C:
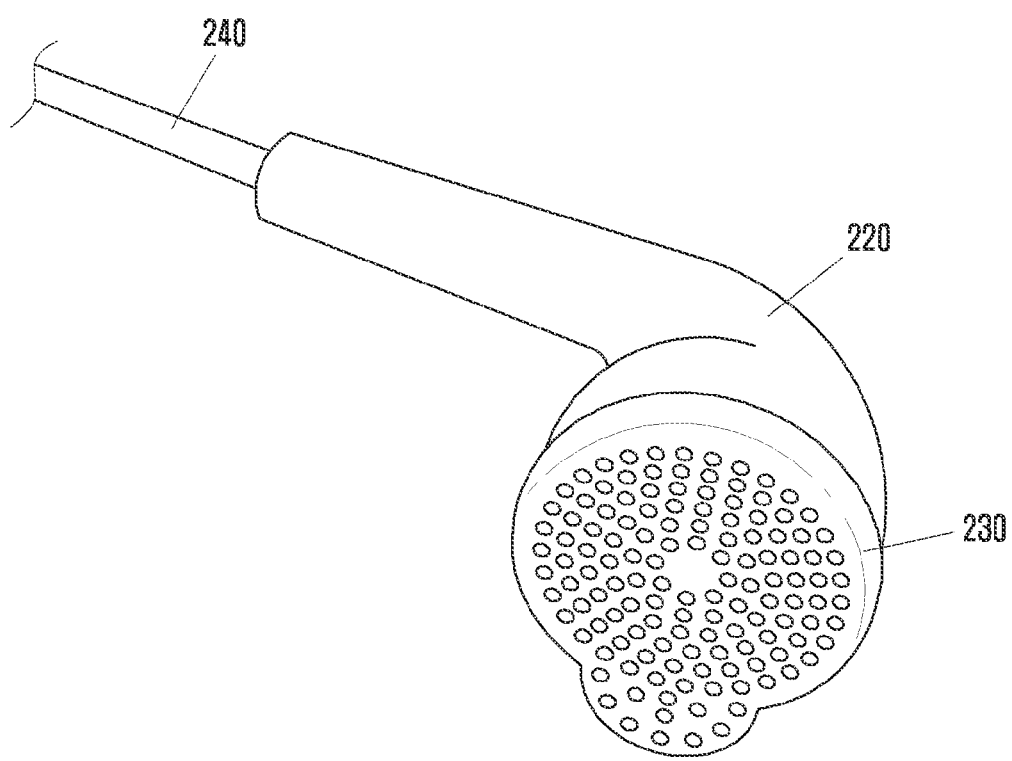
Figure 2D:
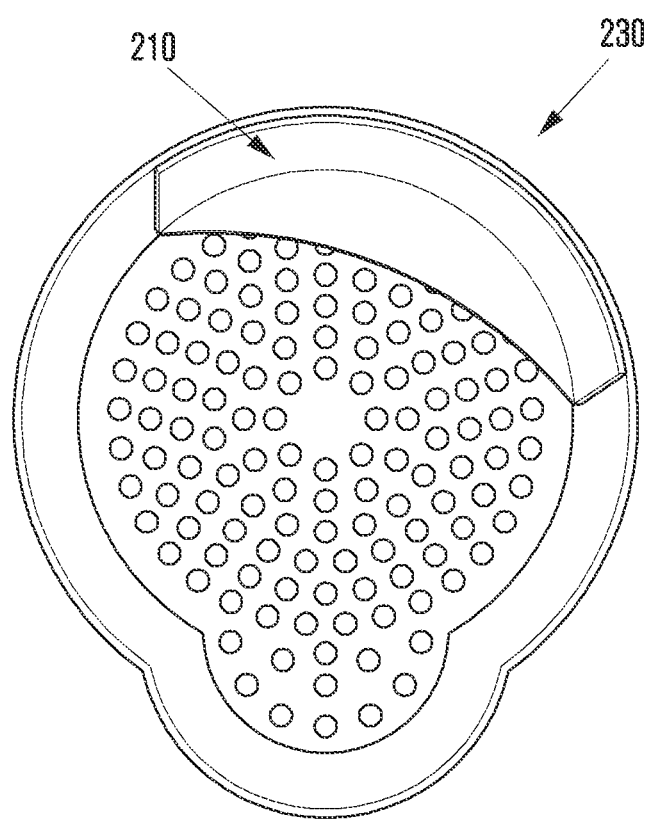

FIGS. 2C and 2D illustrate another arrangement of a non-powered sensor 210 according to an embodiment of the present disclosure.

Referring to FIGS. 2C and 2D, the non-powered sensor 210 may be placed at the inner surface of the case 230 enclosing the head section 220 and the head section 220 may be coupled to cable 240. The case 230 may be made through molding. The case 230 as a member contacting with the ear may be made of materials based on rubber or the like to prevent a feeling of irritation. The case 230 includes a bezel enclosing the front surface of the head section 220 and a cover having multiple holes and placed at the front of the bezel. The non-powered sensor 210 may be placed inside the bezel or at a portion between the cover and bezel. In this arrangement, the non-powered sensor 210 may more accurately measure body temperature at the ear. To place the non-powered sensor 210 inside the case 230, the non-powered sensor 210 may be a Flexible Printed Circuit Board (FPCB) Surface Acoustic Wave (SAW) sensor.

A more detailed configuration of the non-powered sensor 210 is described with reference to FIG. 3.

Figure 3:
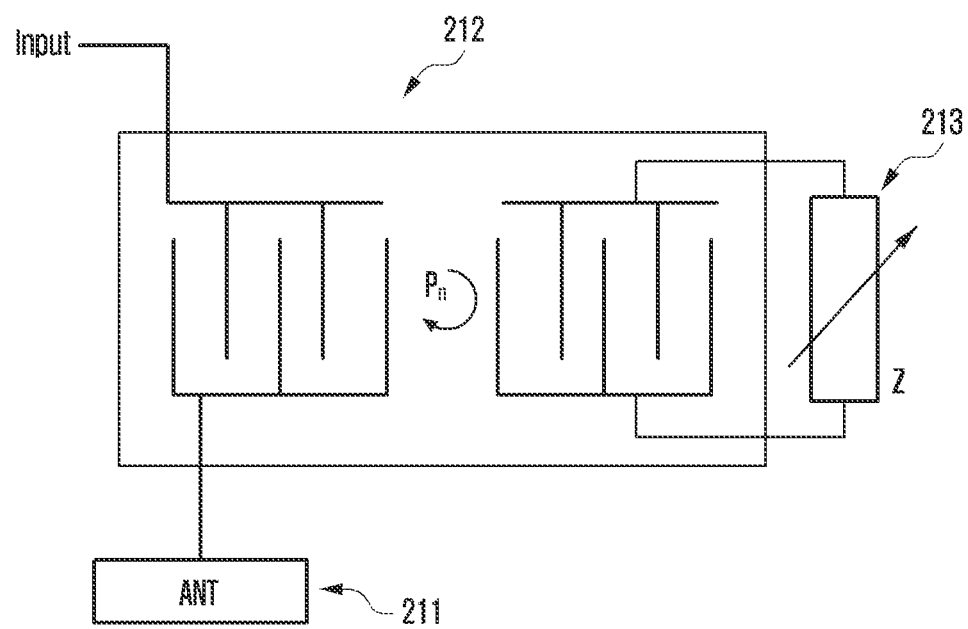
FIG. 3 illustrates a structure of a non-powered sensor in an earphone head, such as the earphone head shown in FIGS. 2A, 2B, 2C, and 2D, according to an embodiment of the present disclosure.

FIG. 3 illustrates a structure of a non-powered sensor in an earphone head, such as the earphone head shown in FIGS. 2A-2D, according to an embodiment of the present disclosure.

Referring to FIG. 3, the non-powered sensor may include a sensing part 213, a transponder 212, and an antenna 211.

The sensing part 213 is configured to sense a change in the external physical environment. The physical property of the sensing part 213 such as surface state may change according to a change in the external physical environment. For example, the surface of the sensing part 213 may be compressed or expanded according to external pressure or a change in temperature. Such a physical state change may be notified to the transponder 212.

The transponder 212 is placed between the sensing part 213 and the antenna 211. The transponder 212 may make a state transition in accordance with a physical change sensed by the sensing part 213. The transponder 212 forwards a non-powered sensor interrogation signal received through the antenna 211 to the sensing part 213, and forwards a non-powered sensor response signal from the sensing part 213 to the antenna 211. The non-powered sensor interrogation signal forwarded through the transponder 212 and the sensing part 213 may be modified according to physical state changes of thereof. That is, the non-powered sensor response signal may correspond to a result of applying physical state changes to the non-powered sensor interrogation signal. When the non-powered sensor 210 is of a wired type (not of a wireless type), the transponder 212 may be connected to a signal line (not to the antenna 211) such as a ground line arranged at the earphone head 201 or 202 of the earphone device 200.

The antenna 211 is connected with the transponder 212, and receives a non-powered sensor interrogation signal from a reader module equipped in the mobile terminal 100 and forwards the same to the transponder 212. The antenna 211 sends a non-powered sensor response signal from the transponder 212 to the reader module. When the non-powered sensor 210 is of a wired type, the antenna 211 may be replaced with a signal line arranged at the earphone device 200. For example, the antenna 211 may be replaced with a ground line arranged at the earphone device 200. Alternatively, the non-powered sensor 210 may be configured to include both the antenna 211 and a signal line. In this case, the mobile terminal 100 may send an interrogation signal to the earphone device 200 and receive a corresponding response signal from the earphone device 200 through at least one of the antenna 211 and the signal line. For example, the mobile terminal 100 may wirelessly send an interrogation signal to the antenna 211 of the non-powered sensor 210 and receive a response signal through the signal line. The mobile terminal 100 may also send an interrogation signal through the signal line and wirelessly receive a response signal from the antenna 211.

Figure 4:
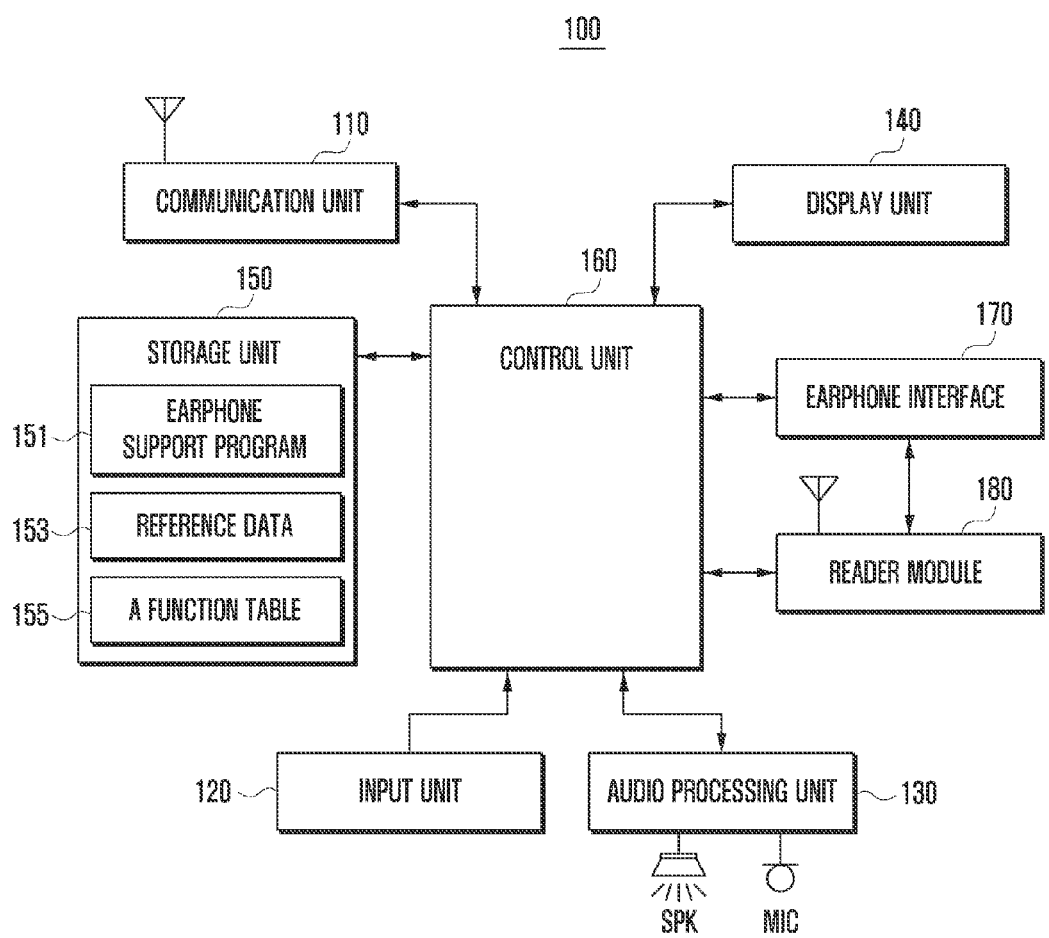
FIG. 4 is a block diagram of a mobile terminal, such as the mobile terminal shown in FIG. 1, according to an embodiment of the present disclosure.

FIG. 4 is a block diagram of a mobile terminal, such as the mobile terminal shown in FIG. 1, according to an embodiment of the present disclosure.

Referring to FIG. 4, the mobile terminal 100 may include a communication unit 110, an input unit 120, an audio processing unit 130, a display unit 140, a storage unit 150, an earphone interface 170, a reader module 180, and a control unit 160.

In the mobile terminal 100 having the above configuration, when the earphone device 200 having a non-powered sensor 210 is plugged in to the earphone interface 170, in response to a preset event, the control unit 160 controls the reader module 180 to send a non-powered sensor interrogation signal for determining the wearing state of the earphone device 200. When a non-powered sensor response signal corresponding to the non-powered sensor interrogation signal is received, the mobile terminal 100 may determine the wearing state of the earphone device 200 on the basis of the non-powered sensor response signal, and activate a function, sustain activation of a function, or deactivate an activated function according to the wearing state. Here, the preset event may correspond to at least one of arrival of a period, arrival of a designated time, and generation of an input signal for determining whether the earphone device 200 is worn after plugging-in of the earphone device 200. The preset event may also correspond to at least one of arrival of a period, arrival of a designated time, and generation of an input signal for determining whether the earphone device 200 is worn regardless of plugging-in of the earphone device 200.

The communication unit 110 supports communication functions of the mobile terminal 100 designed to support communication. When the mobile terminal 100 does not support communication, the communication unit 110 may be excluded. The communication unit 110 may support various communication schemes of the mobile terminal 100, such as mobile communication and wireless short-range communication. Hence, when the mobile terminal 100 is designed to support multiple communication schemes, the communication unit 110 may include multiple communication modules supporting the individual communication schemes. For example, to support mobile communication, the communication unit 110 may include at least one communication module based on 2G, 3G or 4G mobile communication. To support wireless short-range communication, the communication unit 110 may include at least one of a Bluetooth module, a Near Field Communication (NFC) module, and a Radio Frequency IDdentification (RFID) module.

The communication unit 110 may be activated or deactivated adaptively according to states of installation and wearing of the earphone device 200 under control of the control unit 160. For example, when the earphone device 200 is plugged in and is worn by the user, the communication unit 110 may be automatically activated and establish a communication channel to another mobile terminal having a phone number selected by default or by the user in advance. When the earphone device 200 is taken off (i.e., transition from a wearing state to a non-wearing state), the communication unit 110 may be automatically deactivated. For example, when the earphone device 200 is taken off during a call, a call termination signal may be sent through the communication unit 110. Alternatively, when the earphone device 200 is taken off during a call, an audio signal received through the communication unit 110 may be automatically output through the speaker SPK. Functions selected according to wearing or non-wearing of the earphone device 200 may be adjusted according to user settings, and the mobile terminal 100 may provide a screen interface for configuration of the user settings.

The input unit 120 is configured to generate input signals necessary for operation of the mobile terminal 100. The input unit 120 may include physical keys such as a home key, a side key, a power key, and the like. When the display unit 140 has a touchscreen feature, the input unit 120 may include virtual keys output on the display unit 140. For example, according to user control, the input unit 120 may generate an input signal for activating an application control mode of the mobile terminal 100 based on the non-powered sensor 210 by default, and an input signal for deactivating the default application control mode. To manage individual functions of the mobile terminal 100 in the application control mode, according to user control, the input unit 120 may generate an input signal for invoking an application control mode setting screen, an input signal for selecting at least one function to be executed in the application control mode, and an input signal for deselecting a function selected for execution in the application control mode. The mobile terminal 100 may output the application control mode setting screen on the display unit 140 in response to reception of a preset input signal, and select or deselect a function for execution in the application control mode in response to reception of another preset input signal. The generated input signals are sent to the control unit 160 and may be used as commands for executing corresponding functions.

The audio processing unit 130 may support at least one of outputting and collecting audio signals necessary for operation of the mobile terminal 100. The audio processing unit 130 may include a speaker (SPK) to output an audio signal and a microphone (MIC) to collect an audio signal. The audio processing unit 130 may support output of a sound notification guiding application control mode settings. For example, when a function to be activated has been selected for execution in the application control mode, the audio processing unit 130 may output a sound notification indicating selection for the application control mode.

In addition, the audio processing unit 130 may change audio signal output paths according to states of installation and wearing of the earphone device 200. For example, when the earphone device 200 is not plugged in, the audio processing unit 130 may output an audio signal through the speaker of the mobile terminal 100. When the earphone device 200 is not plugged in during call processing, the audio processing unit 130 may output an audio signal through a receiver. When the earphone device 200 is plugged in and is worn, the audio processing unit 130 may output an audio signal to the earphone device 200. When the earphone device 200 is plugged in but is not worn, the audio processing unit 130 may output an audio signal through the speaker. Here, the audio processing unit 130 may obtain state information of the earphone device 200 from the control unit 160.

The display unit 140 may output various screens needed for operation of the mobile terminal 100. For example, the display unit 140 may output a standby screen, a menu screen and the like according to operation of the mobile terminal 100. The display unit 140 may output various screens related to functions of the mobile terminal 100, such as call handling, video call handling, phonebook handling, audio file playback, broadcast reception, video playback, and the like according to user requests or preset scheduling information. For example, the display unit 140 may output information related to installation and wearing of the earphone device 200 in the form of an image or a text string at a portion of the screen. For example, the display unit 140 may output image information related to installation and wearing of the earphone device 200 in the indicator region. The display unit 140 may also output text information related to installation and wearing of the earphone device 200 in a popup window on the screen. In addition, the display unit 140 may output information regarding functions usable when the earphone device 200 is installed and is worn. An example of such a screen on the display unit 140 is described in more detail with reference to FIG. 14.

The storage unit 150 stores various programs and data needed for operation of the mobile terminal 100. For example, the storage unit 150 may store an operating system for operating the mobile terminal 100, an application program for communication through the communication unit 110, a program for broadcast reception, and data generated by various functions. For example, to support the application control mode of the present disclosure, the storage unit 150 may store an earphone support program 151, a function table 155, and reference data 153.

The earphone support program 151 may include various routines to support adaptive execution of functions of the mobile terminal 100 according to installation and wearing of the earphone device 200. For example, the earphone support program 151 may include a routine to determine whether the earphone device 200 is plugged in, and a routine to determine whether the earphone device 200 is worn. Here, the routine for determining wearing of the earphone device 200 may include a routine to send a non-powered sensor interrogation signal, a routine to compare a non-powered sensor response signal received as a reply to the non-powered sensor interrogation signal with the reference data 153, and a routine to determine whether the earphone device 200 is worn according to the comparison result.

The earphone support program 151 may include a function control routine to adjust execution of a function associated with an application program or to sustain the existing state of the function according to whether the earphone device 200 is worn. Here, the function control routine may include a routine to examine the type of a function, and a routine to adjust the function with reference to the function table 155 according to whether the earphone device 200 is worn.

The function table 155 may contain information regarding mappings between functions available in the application control mode and states of installation and wearing of the earphone device 200. For example, the function table 155 may contain control information on whether to activate or deactivate a call handling function according to whether the earphone device 200 is worn, and may contain information for determining the audio signal output path during a call according to whether the earphone device 200 is worn. The function table 155 may also store setting information for volume control according to whether the earphone device 200 is worn, and setting information for outputting specified information or performing a specific function according to the body temperature of the wearer of the earphone device 200. When the earphone device 200 is plugged in to the earphone interface 170, the control unit 160 may invoke the function table 155 and use the same to determine a function to be executed or to support a function according to whether the earphone device 200 is worn.

The reference data 153 is data used to determine whether the earphone device 200 is worn. That is, the reference data 153 may be the same as a non-powered sensor response signal received from the non-powered sensor 210 when the earphone device 200 is worn. Here, the reference data 153 may correspond to a sensor response signal from the non-powered sensor 210 to which physical pressure is applied due to wearing of the earphone device 200, to a sensor response signal from the non-powered sensor 210 exposed to a specific temperature due to wearing of the earphone device 200, and to a sensor response signal from the non-powered sensor 210 separated by a specific distance from the reader module 180. Hence, the reference data 153 may be used by the reader module 180 to determine whether the earphone device 200 is worn after the earphone device 200 is plugged in to the mobile terminal 100.

To determine whether the earphone device 200 is worn, the reader module 180 sends a non-powered sensor interrogation signal and receives a non-powered sensor response signal corresponding thereto under control of the control unit 160. The reader module 180 forwards the received non-powered sensor response signal to the control unit 160. To this end, the reader module 180 may emit a non-powered sensor interrogation signal in a wired or wireless manner according to design of the non-powered sensor 210. That is, when the non-powered sensor 210 is of a wireless type with the antenna 211, the reader module 180 may generate a non-powered sensor interrogation signal and wirelessly send the non-powered sensor interrogation signal to the non-powered sensor 210. To this end, the reader module 180 may include an antenna to send a non-powered sensor interrogation signal and receive a non-powered sensor response signal.

When the non-powered sensor 210 is of a wired type, the reader module 180 may send a non-powered sensor interrogation signal through a ground terminal of the earphone interface 170 and ground lines of the earphone device 200 connected to the ground terminal. The reader module 180 may receive a non-powered sensor response signal corresponding to the non-powered sensor interrogation signal through the same signal lines. In this case, the reader module 180 may be designed not to have an antenna for sending a non-powered sensor interrogation signal and receiving a non-powered sensor response signal.

Figure 5:
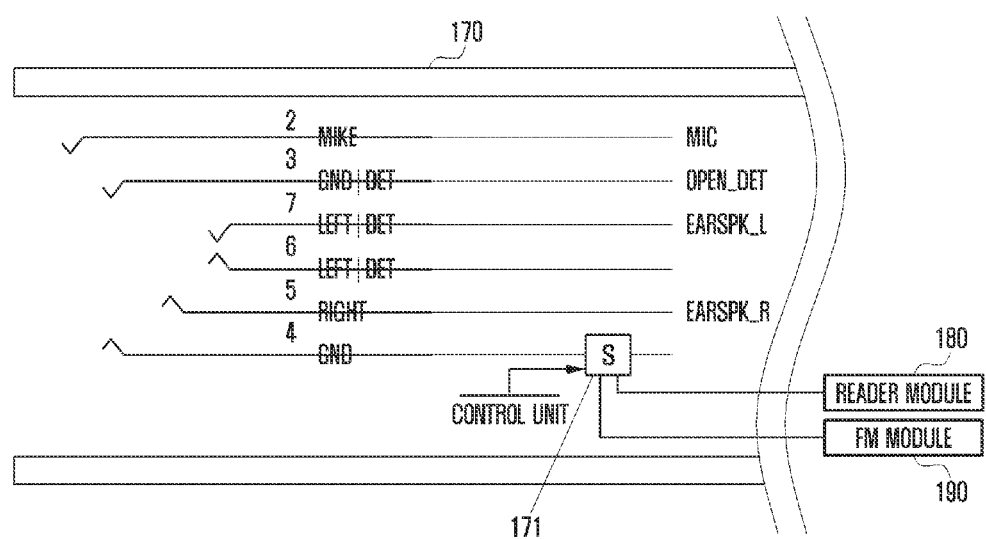
FIG. 5 illustrates a structure of an earphone interface in a mobile terminal, such as the mobile terminal of FIG. 4, according to an embodiment of the present disclosure.

FIG. 5 illustrates a structure of an earphone interface in a mobile terminal, such as the mobile terminal of FIG. 4, according to an embodiment of the present disclosure.

Referring to FIG. 5, the earphone interface 170 is a member to which the earphone device 200 is plugged in. To this end, the earphone interface 170 may take a form of a groove having a size matching the earphone jack 203 of the earphone device 200. Within the earphone interface 170, terminals are arranged so as to contact with terminals formed at the earphone jack 203. As shown in FIG. 5, the earphone interface 170 may include a "MIC" terminal, "OPEN_DET" terminal, "EARSPK_L" terminal, "EARSPK_R" terminal and "GND" terminal, and may further include unused terminals. The "OPEN_DET" terminal may be used to determine whether the earphone device 200 is plugged in. For example, among the terminals of the earphone interface 170, the "GND" terminal may be used to send and receive non-powered sensor signals. To this end, the "GND" terminal is connected with ground lines of the earphone device 200. These ground lines are extended to the earphone heads 201 and 202 and the non-powered sensors 210 are respectively connected with the ground lines. Hence, a non-powered sensor interrogation signal may be sent to the non-powered sensors 210 arranged at the earphone heads 201 and 202 through the ground lines, and a non-powered sensor response signal may be sent from the non-powered sensors 210 to the mobile terminal 100 through the same ground lines.

When the mobile terminal 100 supports a radio feature, the "GND" terminal of the earphone interface 170 may serve as a radio antenna connectable to a radio module such as an FM module 190. Hence, the mobile terminal 100 may further include a switch 171 to prevent the "GND" terminal from being simultaneously used by the FM module 190 and the reader module 180. The switch 171 may be controlled by the control unit 160. The switch 171 may be set by default to interconnect the reader module 180 and the "GND" terminal, and may be set to interconnect the FM module 190 and the "GND" terminal in response to a request for radio feature activation. That is, the earphone interface 170 controls the switch 171 to make an electrical connection between the reader module 180 and the "GND" terminal during the application control mode, and controls the switch 171 to make an electrical connection between the FM module 190 and the "GND" terminal during radio feature activation.

The control unit 160 controls signal exchange, data processing and distribution, function control and state monitoring of the non-powered sensor 210 to support the application control mode of the present disclosure. To achieve this, the control unit 160 may have a configuration shown in FIG. 6.

Figure 6:
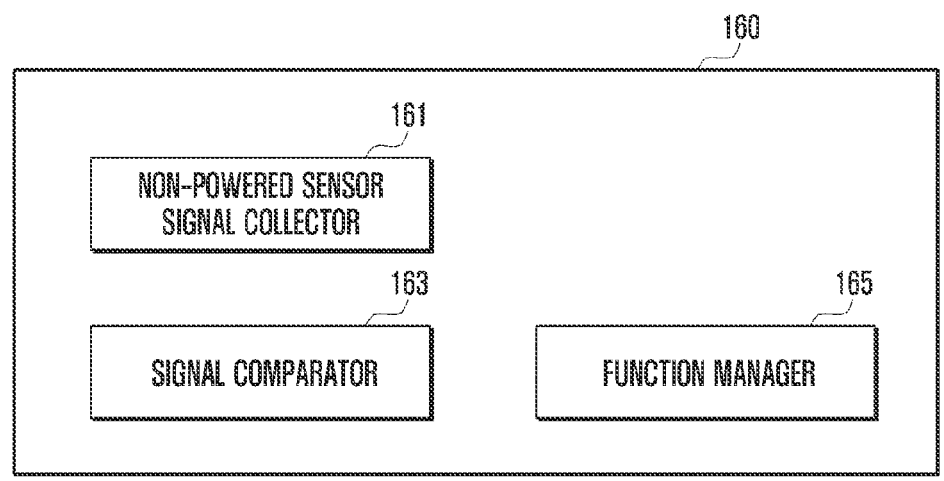
FIG. 6 illustrates a configuration of a control unit in the mobile terminal of FIG. 4 according to an embodiment of the present disclosure.

FIG. 6 illustrates a configuration of a control unit in the mobile terminal of FIG. 4 according to an embodiment of the present disclosure.

Referring to FIG. 6, the control unit 160 may include a non-powered sensor signal collector 161, a signal comparator 163, and a function manager 165.

The non-powered sensor signal collector 161 controls the reader module 180 to send a non-powered sensor interrogation signal having a preset pattern to the non-powered sensor 210 arranged in the earphone device 200. Here, the non-powered sensor signal collector 161 may control transmission of a non-powered sensor interrogation signal according to a preset event. For example, the non-powered sensor signal collector 161 may control transmission of a non-powered sensor interrogation signal when the earphone device 200 is plugged in to the earphone interface 170. The non-powered sensor signal collector 161 may control transmission of a non-powered sensor interrogation signal at regular intervals after installation of the earphone device 200. The non-powered sensor signal collector 161 may examine terminals arranged in the earphone interface 170 to determine whether the earphone device 200 is installed or uninstalled.

As described above, transmission of a non-powered sensor interrogation signal may be performed selectively in a wired or wireless manner. Alternatively, the non-powered sensor signal collector 161 may initiate transmission of a non-powered sensor interrogation signal in a wired manner a preset number of times first, and, when a non-powered sensor response signal is not successfully received, may then initiate transmission of a non-powered sensor interrogation signal in a wireless manner. When a non-powered sensor response signal is received through the reader module 180, the non-powered sensor signal collector 161 may forward the same to the signal comparator 163. In addition, according to design, the non-powered sensor signal collector 161 may initiate transmission of a non-powered sensor interrogation signal at regular intervals even when the earphone device 200 is not plugged in to the earphone interface 170. Here, the non-powered sensor signal collector 161 may control transmission of a non-powered sensor interrogation signal in a wireless manner. Use of the earphone device based on a non-powered sensor in a wireless manner may be applied to a wireless headset.

The non-powered sensor signal collector 161 may control the switch 171 arranged in the earphone device 200. Namely, when the earphone device 200 is plugged in to the earphone interface 170, the non-powered sensor signal collector 161 may control the switch 171 to interconnect the "GND" terminal and the reader module 180 by default. Upon reception of a request for radio feature activation using the FM module 190, the non-powered sensor signal collector 161 may control the switch 171 to interconnect the "GND" terminal and the FM module 190 so that ground lines of the earphone device 200 connected to the "GND" terminal may act as an antenna for the FM module.

The signal comparator 163 may compare a non-powered sensor response signal delivered through the non-powered sensor signal collector 161 with the reference data 153. The signal comparator 163 may send the result of comparison between a non-powered sensor response signal and the reference data 153 to the function manager 165. When the reference data 153 is composed of multiple reference values, the signal comparator 163 may determine the reference value corresponding to a received non-powered sensor response signal and notify the corresponding reference value to the function manager 165.

For example, the earphone heads 201 and 202 may include non-powered sensors 210 respectively. The non-powered sensor signal collector 161 may send a non-powered sensor interrogation signal to the non-powered sensors 210, receive corresponding non-powered sensor response signals therefrom, and forward the received non-powered sensor response signals to the signal comparator 163. That is, the signal comparator 163 may compare two non-powered sensor response signals received from the non-powered sensors 210 of the earphone heads 201 and 202 with the reference data 153. Here, the signal comparator 163 may compare a first one of the non-powered sensor response signals with a pressure reference value. The signal comparator 163 may compare a second one of the non-powered sensor response signals with a temperature reference value. The signal comparator 163 may forward the comparison results related to pressure and temperature to the function manager 165. According to design, the signal comparator 163 may compare the non-powered sensor response signals with either the pressure reference value or the temperature reference value and forward the comparison results to the function manager 165.

To address the above situations, the mobile terminal 100 may pre-store various reference data suitable for the situations, such as a pressure reference value, a temperature reference value, and a distance reference value. Each reference data may include a signal value when the earphone device 200 is worn and a signal value when the earphone device 200 is not worn, and may further include signal values corresponding to levels of a physical quantity while the earphone device 200 is worn. Here, the physical quantity may be, for example, pressure or body temperature measured when the earphone device 200 is worn.

The function manager 165 controls execution of a specific function of the mobile terminal 100 adaptively according to the result of comparison between a non-powered sensor response signal and the reference data 153 provided by the signal comparator 163. To this end, the function manager 165 may control function execution with reference to the function table 155 according to the state of wearing of the earphone device 200.

For example, when a comparison result received from the signal comparator 163 indicates that the earphone device 200 is installed and is worn, the function manager 165 may automatically initiate playback of a preset file such as an audio file, a video file, an e-book file, and the like, and control output of a screen and audio signal correspondingly. Here, the function manager 165 may perform audio control so that the audio signal is output to the earphone device 200. When a comparison result indicates that the earphone device 200 is worn, the function manager 165 may automatically control establishment of a voice call channel to an external mobile terminal associated with a preset or user input phone number. Here, it is determined that a camera module is operated and the display unit 140 is viewed straight by the user, the function manager 165 may automatically control establishment of a video call channel instead of a voice call channel. To this end, the mobile terminal 100 may further include a camera module. Here, the camera module may be a front-facing camera to support video calls.

As another example, when the earphone device 200 is worn, the function manager 165 may perform automatic volume adjustment, audio signal output path switching, and output of a notification based on body temperature information. The function manager 165 may pause playback of a current app when the earphone device 200 is taken off the ear, and may resume playback of the paused app or keep an app being played when the earphone device 200 is worn again or is kept worn. In addition, the function manager 165 may automatically initiate sound or video recording when the earphone device 200 is taken off the ear, and may end sound or video recording when the earphone device 200 is worn again.

Figure 7:
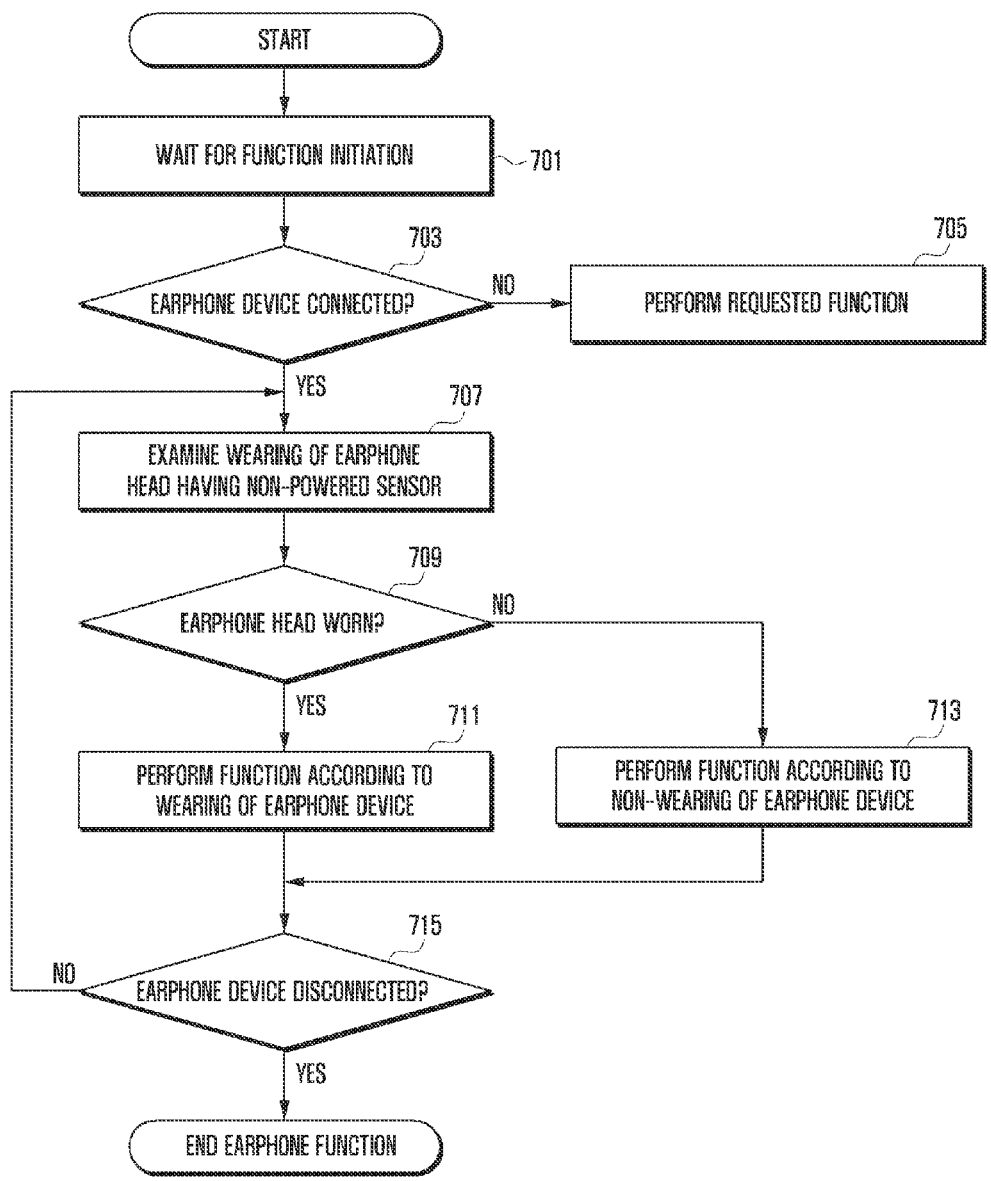
FIG. 7 illustrates an application control method for a mobile terminal according to an embodiment of the present disclosure.

FIG. 7 illustrates an application control method for a mobile terminal according to an embodiment of the present disclosure.

Referring to FIG. 7, in the application control method, at operation 701, the control unit 160 of the mobile terminal 100 waits for function initiation. For example, the control unit 160 may supply power from a power source to individual components of the mobile terminal 100 to support the application control mode. Thereafter, at operation 703, the control unit 160 determines whether the earphone device 200 is connected. If the earphone device 200 is not connected, the control unit 160 proceeds to operation 705 at which the control unit 160 performs a user function according to preset scheduling information or an input signal generated by the input unit 120. Here, to determine connection of the earphone device 200, the control unit 160 may detect a signal change at a specific terminal arranged at the earphone interface 170.

If the earphone device 200 is connected to the earphone interface 170 at operation 703, the control unit 160 proceeds to operation 707 at which the control unit 160 tests wearing of the earphone heads 201 and 202 having a non-powered sensor 210. To this end, the control unit 160 may control transmission of a non-powered sensor interrogation signal or a dummy signal to the non-powered sensor 210. More specifically, the control unit 160 may control the reader module 180 to send a non-powered sensor interrogation signal of a preset pattern in a wired or wireless manner. The control unit 160 may also control the reader module 180 to send a dummy signal and temporarily store the dummy signal. Thereafter, the control unit 160 may control the reader module 180 to receive a non-powered sensor response signal corresponding to the non-powered sensor interrogation signal or to receive a response signal corresponding to the dummy signal.

At operation 709, the control unit 160 determines whether the earphone device 200 is worn. That is, the control unit 160 may compare the result of comparison between the sent non-powered sensor interrogation signal and the received non-powered sensor response signal with the preset reference data 153. The control unit 160 may also compare the result of comparison between the sent dummy signal and the received response signal with the reference data 153. If the earphone device 200 is worn (i.e., the comparison result with respect to the reference data 153 indicates wearing), the control unit 160 proceeds to operation 711 at which the control unit 160 performs a function according to wearing of the earphone device 200. For example, according to wearing of the earphone device 200, the control unit 160 may automatically place a call using a preset phone number, automatically play back a preset audio or video file producing an audio signal, automatically execute an app supporting broadcast reception on a preset channel, or the like.

If the earphone device 200 is not worn or is taken off at operation 709, the control unit 160 proceeds to operation 713 at which the control unit 160 performs a function according to non-wearing of the earphone device 200. For example, the control unit 160 may sustain the existing state of the mobile terminal 100. Alternatively, according to being taken off of the earphone device 200, the control unit 160 may pause execution of the current application function or automatically initiate recording of data produced by the currently executed app function.

At operation 715, the control unit 160 determines whether the earphone device 200 is disconnected or uninstalled. If the earphone device 200 is disconnected, the control unit 160 ends the earphone function. If the earphone device 200 is not disconnected, the control unit 160 returns to operation 707 and continues the above procedure. Meanwhile, the control unit 160 may determine whether the earphone device 200 is worn at regular intervals and perform a function according to the determined result. The control unit 160 may also determine whether the earphone device 200 is worn in real time after the earphone device 200 is connected. Alternatively, upon reception of an input signal for wearing determination from the input unit 120 after the earphone device 200 is connected, the control unit 160 may determine whether the earphone device 200 is worn and perform a function according to the determined result.

Figure 8:
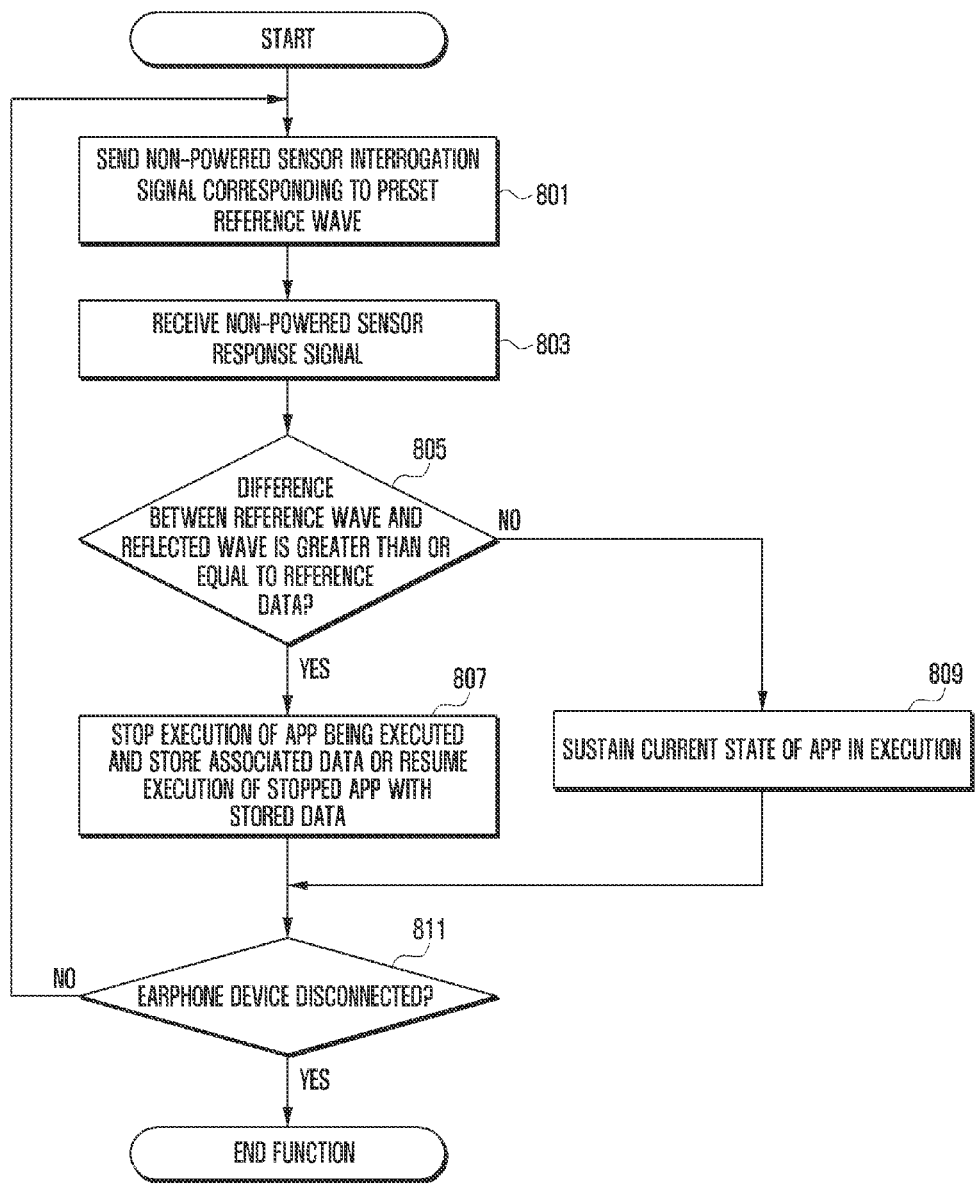
FIG. 8 illustrates application execution handling in an application control method according to an embodiment of the present disclosure.

FIG. 8 illustrates application execution handling in an application control method according to an embodiment of the present disclosure.

Referring to FIG. 8, the control unit 160 sends a non-powered sensor interrogation signal corresponding to a preset reference wave to the non-powered sensor 210 according to preconfigured settings at operation 801. At operation 803, the control unit 160 receives a reflected wave as a non-powered sensor response signal. Upon reception of a non-powered sensor response signal, the control unit 160 determines whether the difference between the reference wave and the reflected wave is greater than or equal to a reference value in consideration of the reference data 153 at operation 805.

If the difference between the reference wave and the reflected wave is greater than or equal to the reference value, the control unit 160 proceeds to operation 807 at which the control unit 160 stops execution of an application being executed and stores associated data or resumes execution of a stopped application with stored data. That is, when the difference between the reference wave and the reflected wave indicates a change in the state of wearing the earphone device 200 (from wearing to non-wearing or from non-wearing to wearing), the control unit 160 may perform a function according to wearing or non-wearing of the earphone device 200.

Here, the application control mode operation based on the non-powered sensor 210 may be simplified by detecting a change in the signal of the non-powered sensor 210. For example, the mobile terminal 100 may record a history of changes of the reflected wave relative to the reference wave. That is, the mobile terminal 100 may record information on execution state of an application (executed or paused) before occurrence of a change of the reflected wave relative to the reference wave. Thereafter, upon occurrence of a change of the reflected wave relative to the reference wave, the mobile terminal 100 may pause execution of an application being executed or resume execution of a paused application.

If the difference between the reference wave and the reflected wave is less than the reference value (i.e., no change in the state of wearing the earphone device 200) at operation 805, the control unit 160 proceeds to operation 809 at which the control unit 160 sustains the current state of an application. That is, the control unit 160 may place a paused application in a paused state and continue to execute an application being executed.

At operation 811, the control unit 160 determines whether the earphone device 200 is disconnected. If the earphone device 200 is not disconnected, the control unit 160 returns to at operation 801 and continues the above procedure.

Figure 9:
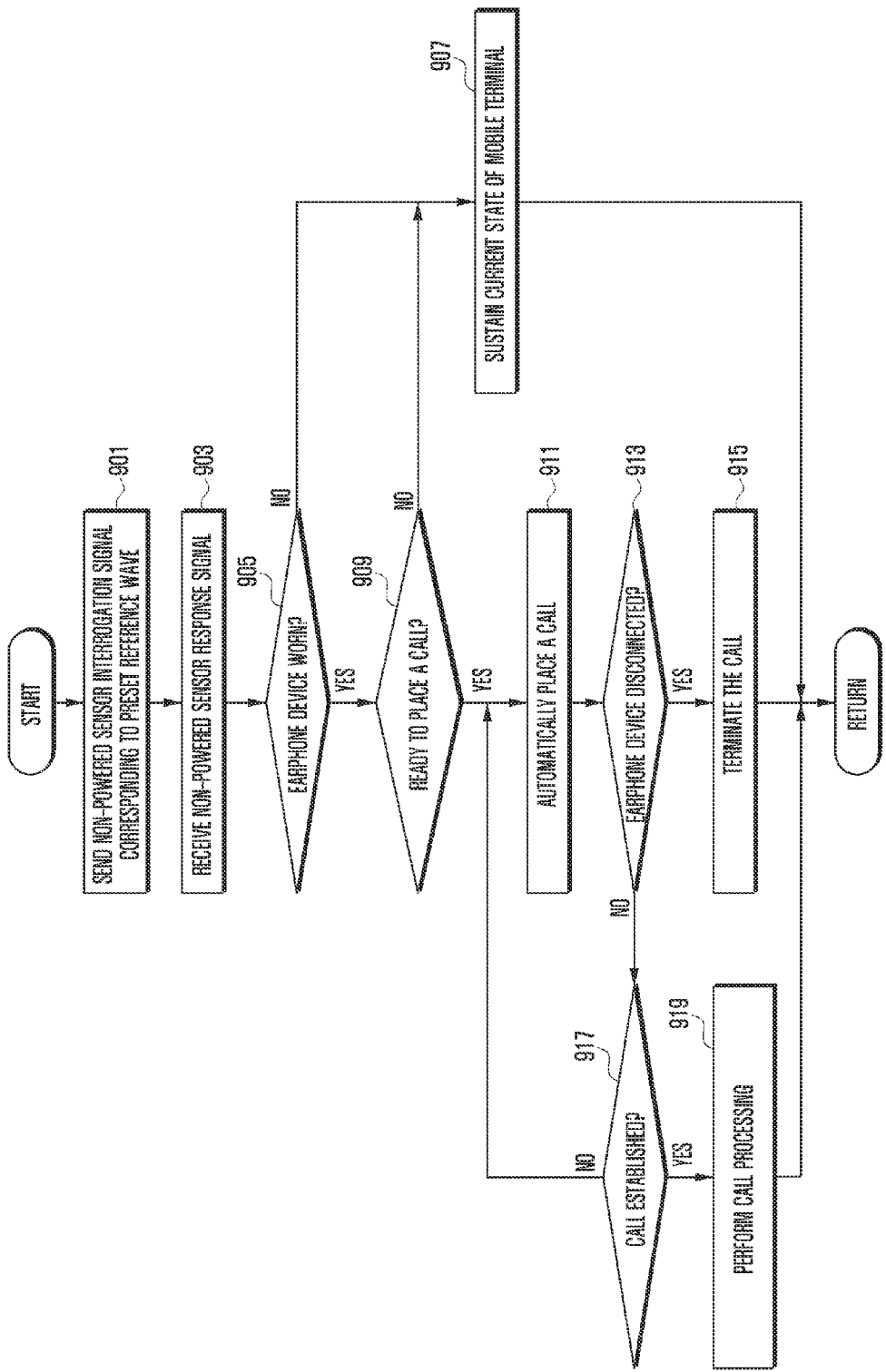
FIG. 9 illustrates automatic call handling in an application control method according to an embodiment of the present disclosure.

FIG. 9 illustrates automatic call handling in an application control method according to an embodiment of the present disclosure.

Referring to FIG. 9, the control unit 160 sends a non-powered sensor interrogation signal corresponding to a preset reference wave to the non-powered sensor 210 according to preconfigured settings at operation 901. At operation 903, the control unit 160 receives a non-powered sensor response signal. At operation 905, the control unit 160 determines whether the non-powered sensor response signal indicates wearing of the earphone device 200. Here, as described above, wearing of the earphone device 200 may be determined according to the difference between the non-powered sensor interrogation signal and non-powered sensor response signal. If the non-powered sensor response signal indicates non-wearing of the earphone device 200, the control unit 160 proceeds to operation 907 at which the control unit 160 sustains the current state of the mobile terminal 100.

If the non-powered sensor response signal indicates wearing of the earphone device 200, the control unit 160 proceeds to operation 909 at which the control unit 160 determines whether it is ready to place a call. If it is not ready to place a call, the control unit 160 proceeds to operation 907 at which the control unit 160 sustains the current state of the mobile terminal 100. If it is ready to place a call, the control unit 160 proceeds to operation 911 at which the control unit 160 automatically places a call. Here, entering a phone number or selecting a phone number in a phonebook may correspond to readiness for a call.

At operation 913, the control unit 160 determines whether the earphone device 200 is disconnected. If the earphone device 200 is disconnected, the control unit 160 proceeds to operation 915 at which the control unit 160 ends the call. If the earphone device 200 is not disconnected, the control unit 160 proceeds to operation 917 at which the control unit 160 determines whether the call is established. If the call is established, the control unit 160 proceeds to operation 919 at which the control unit 160 performs call processing. If the call is not established, the control unit 160 returns to operation 911 and tries to place a call. After completion of operation 907, operation 915 and operation 919, the control unit 160 may return to the operation standby state. For example, the control unit 160 may output a standby screen or return to a previous state before the earphone device 200 is connected.

Figure 10:
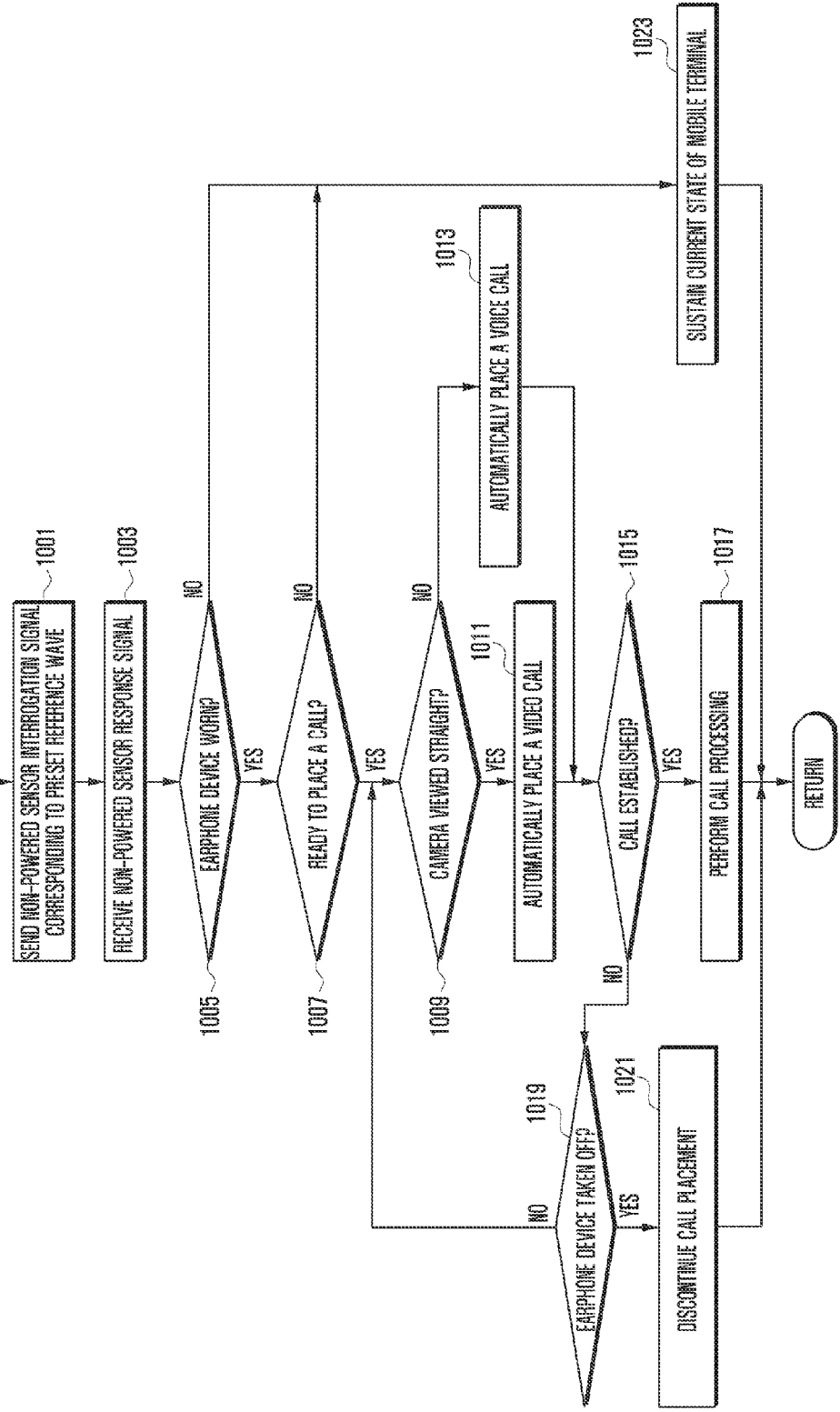
FIG. 10 illustrates automatic video call handling in an application control method according to an embodiment of the present disclosure.

FIG. 10 illustrates automatic video call handling in an application control method according to an embodiment of the present disclosure.

Referring to FIG. 10, the control unit 160 sends a non-powered sensor interrogation signal corresponding to a preset reference wave according to preconfigured settings at operation 1001. Here, the control unit 160 may control transmission of a non-powered sensor interrogation signal when the earphone device 200 is plugged in to the earphone interface 170. The control unit 160 may also control transmission of a non-powered sensor interrogation signal regardless of installation of the earphone device 200 according to design.

At operation 1003, the control unit 160 receives a non-powered sensor response signal corresponding to the non-powered sensor interrogation signal. At operation 1005, the control unit 160 determines whether the earphone device 200 is worn. If the earphone device 200 is not worn, the control unit 160 proceeds to operation 1023 at which the control unit 160 sustains the current state of the mobile terminal 100. For example, the control unit 160 may output a webpage on the display unit 140 or support file editing.

If the earphone device 200 is worn, the control unit 160 proceeds to operation 1007 at which the control unit 160 determines whether it is ready to place a call. If it is not ready to place a call, the control unit 160 proceeds to operation 1023 at which the control unit 160 sustains the current state of the mobile terminal 100. If it is ready to place a call, the control unit 160 proceeds to operation 1009 at which the control unit 160 determines whether the camera module is viewed straight by the user. To this end, when it is ready to place a call, the control unit 160 may activate the camera module to capture an image and recognize the eyes and pupil position in the image. When the pupil position or pupil angle is within a preset angle range, the control unit 160 may determine that the camera module is viewed straight by the user.

If the camera module is viewed straight by the user, the control unit 160 proceeds to operation 1011 at which the control unit 160 automatically places a video call. If the camera module is not viewed straight by the user, the control unit 160 proceeds to operation 1013 at which the control unit 160 automatically places a voice call.

At operation 1015, the control unit 160 determines whether the call is established. If the call is established, the control unit 160 proceeds to operation 1017 at which the control unit 160 performs call processing. For example, for video call processing, the control unit 160 may send an image captured by the camera module and an audio signal collected by the microphone to an external mobile terminal, and output an image and audio signal received from the external mobile terminal. For voice call processing, the control unit 160 may send an audio signal collected by the microphone, and output a received audio signal through the earphone device 200.

If the call is not established at operation 1015, the control unit 160 proceeds to operation 1019 at which the control unit 160 determines whether the earphone device 200 is taken off. If the earphone device 200 is taken off, the control unit 160 proceeds to operation 1021 at which the control unit 160 discontinues call placement. That is, during call placement, when the earphone device 200 is taken off before the call is answered by the counterpart user, the control unit 160 may automatically terminate the call. If the earphone device 200 is not taken off, the control unit 160 returns to operation 1009 and tries to place a call.

Figure 11:
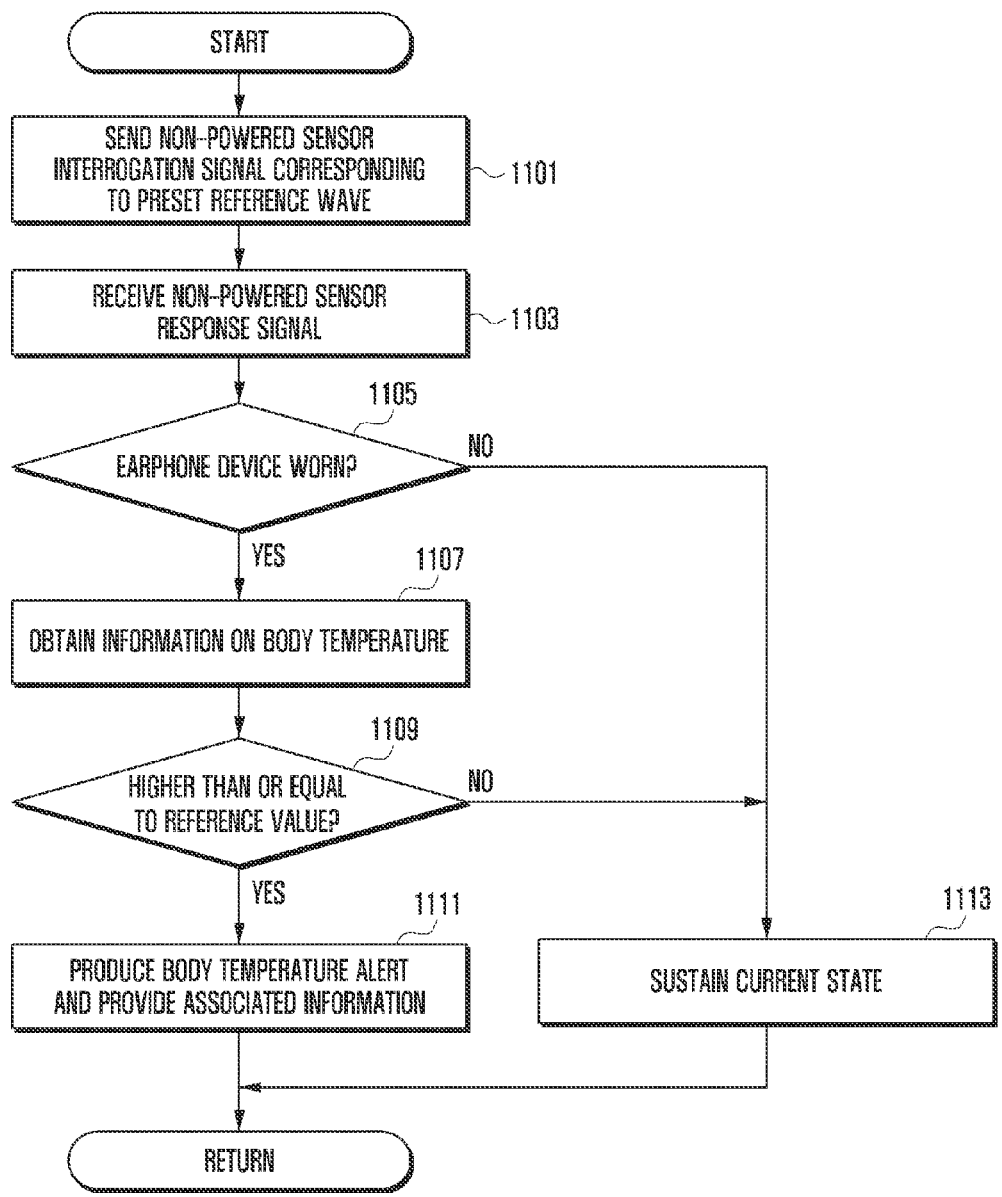
FIG. 11 illustrates usage of body temperature information in an application control method according to an embodiment of the present disclosure.

FIG. 11 illustrates usage of body temperature information in an application control method according to an embodiment of the present disclosure.

Referring to FIG. 11, the control unit 160 sends a non-powered sensor interrogation signal corresponding to a preset reference wave to the non-powered sensor 210 according to preconfigured settings at operation 1101. At operation 1103, the control unit 160 receives a non-powered sensor response signal. Here, the control unit 160 may analyze the non-powered sensor response signal to obtain information on the body temperature of the wearer of the earphone device 200. To this end, the control unit 160 may compare the non-powered sensor response signal with a temperature reference value of the reference data 153. The mobile terminal 100 may add a temperature reference value in the reference data 153 in advance.

At operation 1105, the control unit 160 determines whether the earphone device 200 is worn on the basis of the received non-powered sensor response signal. If the earphone device 200 is not worn, the control unit 160 proceeds to operation 1113 at which the control unit 160 sustains the current state of the mobile terminal 100. If the earphone device 200 is worn, the control unit 160 proceeds to operation 1107 at which the control unit 160 obtains information on the body temperature of the wearer of the earphone device 200 using the received non-powered sensor response signal. At operation 1109, the control unit 160 determines whether the body temperature is higher than or equal to a preset reference value. If the temperature is lower than the preset reference value, the control unit 160 proceeds to operation 1113 at which the control unit 160 sustains the current state of the mobile terminal 100.

If the body temperature is higher than or equal to the preset reference value at operation 1109, the control unit 160 proceeds to operation 1111 at which the control unit 160 produces a body temperature alert and associated information. For example, the control unit 160 may provide information on the body temperature to the wearer of the earphone device 200 and output guide information on actions to be taken at the current body temperature. The control unit 160 may provide pre-stored guide information on actions to be taken according to the body temperature, or connect to a website providing such guide information and output a corresponding webpage. In addition to such guide information, the control unit 160 may mark locations of hospitals in the vicinity of the user of the mobile terminal 100 on a map.

Figure 12:
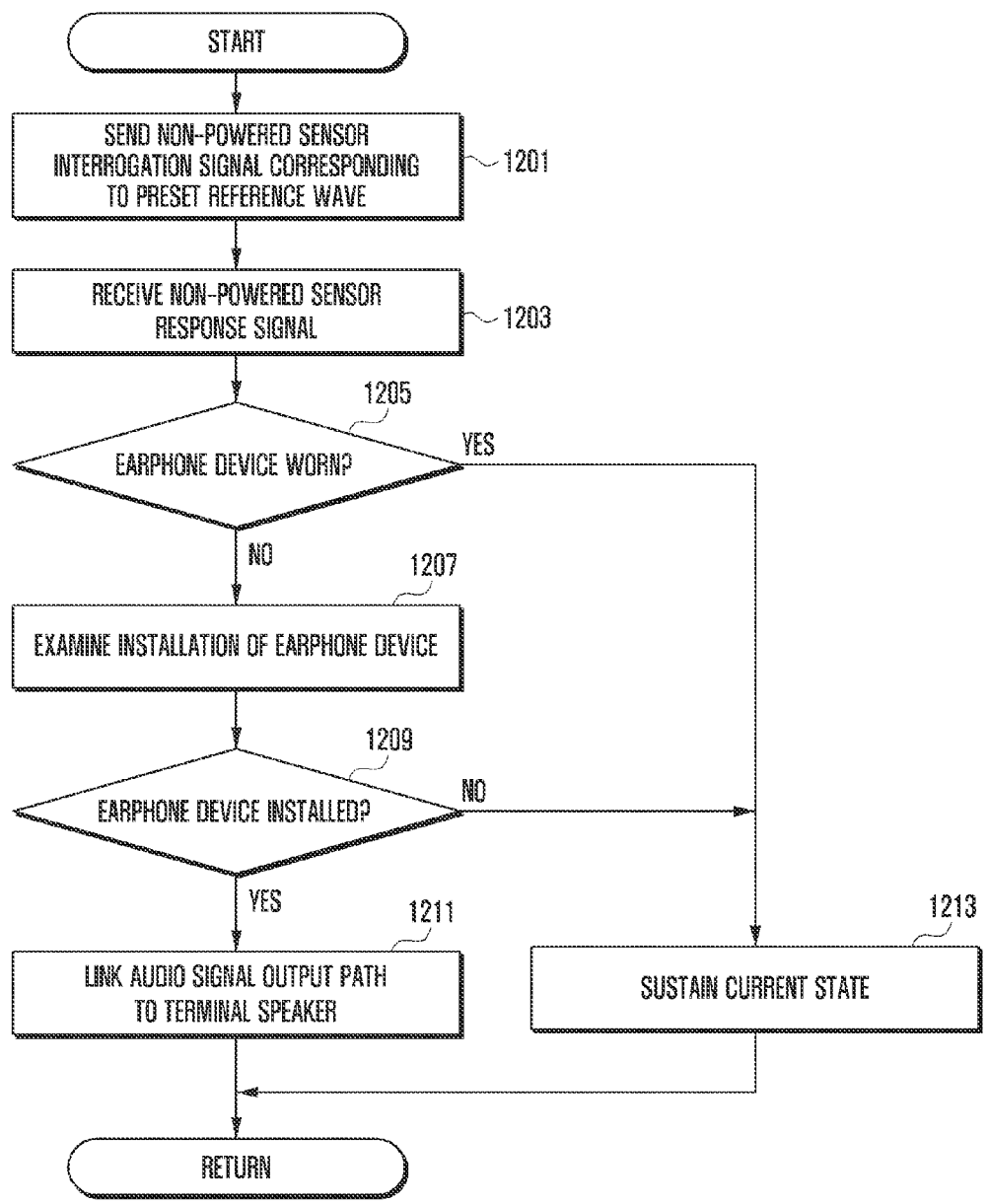
FIG. 12 illustrates audio signal output switching in an application control method according to an embodiment of the present disclosure.

FIG. 12 illustrates audio signal output switching in an application control method according to an embodiment of the present disclosure.

Referring to FIG. 12, the control unit 160 sends a non-powered sensor interrogation signal at operation 1201. At operation 1203, the control unit 160 receives a non-powered sensor response signal. At operation 1205, the control unit 160 determines whether the earphone device 200 is worn. If the earphone device 200 is worn, the control unit 160 proceeds to operation 1213 at which the control unit 160 sustains the current state of the mobile terminal 100.

If the earphone device 200 is not worn at operation 1205, the control unit 160 proceeds to operation 1207 at which the control unit 160 examines installation of the earphone device 200. At operation 1209, the control unit 160 determines whether the earphone device 200 is installed. If the earphone device 200 is installed, the control unit 160 proceeds to operation 1211 at which the control unit 160 links the audio signal output path to the speaker SPK of the mobile terminal 100. If the earphone device 200 is not installed, the control unit 160 proceeds to operation 1213.

In the above description, wearing of the earphone device 200 is examined first and then installation thereof is examined. However, the present disclosure is not limited thereto. For example, in audio signal output switching, installation of the earphone device 200 may be examined first. When the earphone device 200 is installed but is not worn, the audio signal output path may be directed to the speaker SPK of the mobile terminal 100. When the earphone device 200 is installed and is worn, the control unit 160 may link the audio signal output path to the earphone device 200.

Figure 13:
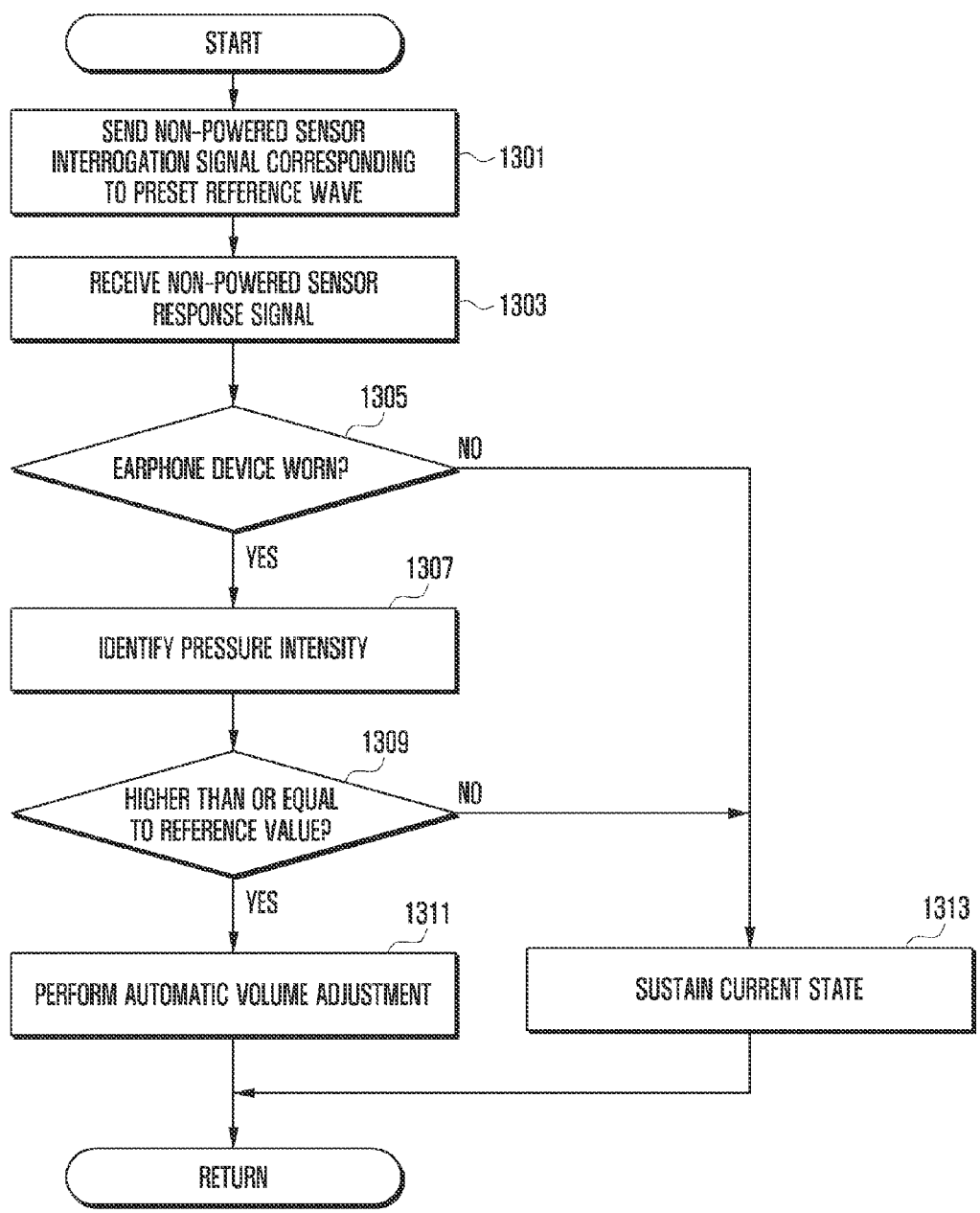
FIG. 13 illustrates automatic volume adjustment in an application control method according to an embodiment of the present disclosure.

FIG. 13 illustrates automatic volume adjustment in an application control method according to an embodiment of the present disclosure.

Referring to FIG. 13, the control unit 160 sends a non-powered sensor interrogation signal at operation 1301. At operation 1303, the control unit 160 receives a corresponding non-powered sensor response signal. At operation 1305, the control unit 160 determines whether the earphone device 200 is worn. If the earphone device 200 is not worn, the control unit 160 proceeds to operation 1313 at which the control unit 160 sustains the current state of the mobile terminal 100.

If the earphone device 200 is worn, the control unit 160 proceeds to operation 1307 at which the control unit 160 identifies the intensity of pressure applied to the non-powered sensor 210. To this end, the control unit 160 may compare the non-powered sensor response signal with a pressure intensity reference value of the reference data 153.

At operation 1309, the control unit 160 determines whether the pressure intensity is higher than or equal to a preset reference value. If the pressure intensity is lower than the preset reference value, the control unit 160 proceeds to operation 1313 at which the control unit 160 sustains the current state of the mobile terminal 100. If the pressure intensity is higher than or equal to the preset reference value, the control unit 160 proceeds to operation 1311 at which the control unit 160 performs automatic volume adjustment.

In an embodiment, the control unit 160 may specify multiple levels of pressure intensity and increase or decrease the sound volume according to the level of pressure intensity. More specifically, in wearing of the earphone device 200, when there is noise in the surroundings, the user may insert the earphone heads 201 and 202 deeper in the ears. In this case, a higher pressure is applied to the non-powered sensors 210 in comparison to a case where the earphone heads 201 and 202 rest on the outer ears. Hence, the control unit 160 may perform automatic volume adjustment by increasing the sound volume when pressure applied to the non-powered sensor 210 is high and by decreasing the sound volume when pressure applied to the non-powered sensor 210 is low.

Figure 14:
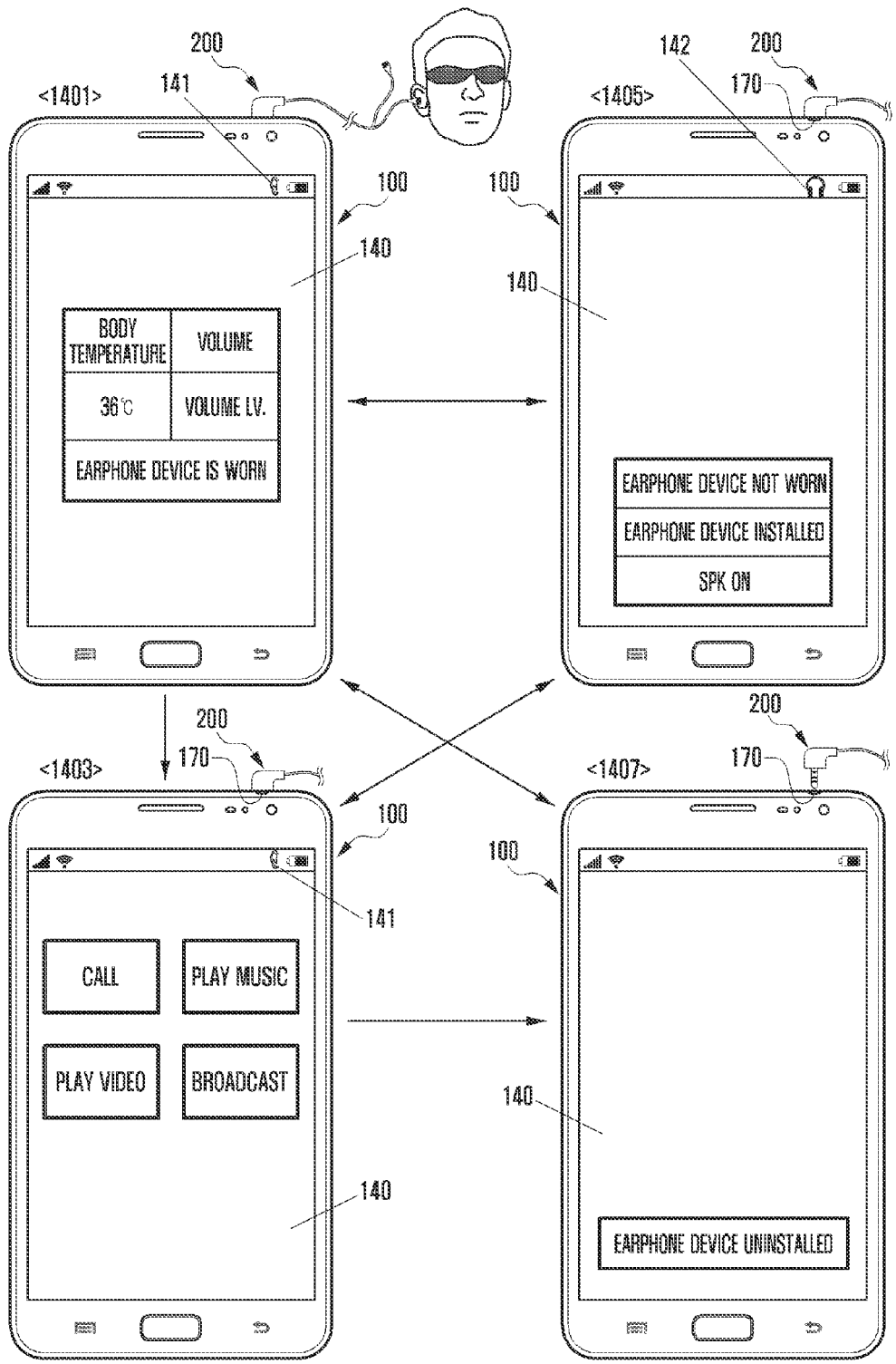
FIG. 14 shows examples of a screen interface of a mobile terminal to support an application control function according to an embodiment of the present disclosure.

FIG. 14 shows examples of a screen interface of a mobile terminal to support an application control function according to an embodiment of the present disclosure.

Referring to FIG. 14, when the earphone device 200 is plugged in to the earphone interface 170 and is worn, at least one of an indication to wearing of the earphone device 200, an indication to body temperature of the wearer, and an indication to the volume level for the earphone device 200 may be output on the display unit 140 as indicated by indicia 1401. Although wearing state, body temperature, and volume level are all output on the display unit 140 in a state indicated by indicia 1401, the present disclosure is not limited thereto.

To output the above information, the mobile terminal 100 may control the reader module 180 to send a non-powered sensor interrogation signal. The non-powered sensor interrogation signal is sent through the ground terminal arranged in the earphone interface 170 and the ground lines contained in the earphone device 200 to the non-powered sensors 210 arranged at the earphone heads 201 and 202. Alternatively, the non-powered sensor interrogation signal may be wirelessly sent by the reader module 180, in which case the reader module 180 may further include an antenna. The antenna contained in the reader module 180 may be an omnidirectional antenna to emit a non-powered sensor interrogation signal.

When a non-powered sensor interrogation signal is received, the non-powered sensor 210 at the earphone head 201 or 202 sends the reader module 180 a non-powered sensor response signal corresponding to a reflected wave of the interrogation signal according to its physical properties. Here, the non-powered sensor 210 may send a reflected wave through the ground lines to the reader module 180, or may wirelessly send a non-powered sensor interrogation signal through a separate antenna to the reader module 180. As described before, multiple non-powered sensors may be utilized by placing one non-powered sensor 210 at each earphone head 201 or 202. For more accurate detection of a sensing signal, multiple non-powered sensors may be arranged in each earphone head.

In a state indicated by indicia 1401, such indicators may be temporarily output and may be removed from the display unit 140 after a preset time. Thereafter, user functions executable during installation and wearing of the earphone device 200 may be output on the display unit 140 as indicated by indicia 1403. For example, a list of functions producing an audio signal output to the earphone device 200, such as call handling, music playback, video playback and broadcast reception, may be displayed on the display unit 140. The user may select one of the functions in the list on the display unit 140 to thereby issue an activation request for the selected function. In response to the activation request, the mobile terminal 100 activates the selected function and outputs a generated audio signal through the earphone device 200.

In addition, as indicated by indicia 1401 and 1403, when the earphone device 200 is installed in the mobile terminal 100 and is worn by the user, a wearing indicator 141 may be output in an indicator region of the display unit 140. As indicated by indicia 1405, when the earphone device 200 is installed in the mobile terminal 100 but is not worn, a non-wearing indicator 142 may be output in the indicator region of the display unit 140.

In response to a transition from the wearing state of the earphone device 200 to the non-wearing state, as indicated by indicia 1405, an indicator to non-wearing of the earphone device 200 and an indicator to installation thereof may be output on the display unit 140. Here, the mobile terminal 100 performs a function according to non-wearing of the earphone device 200. For example, the mobile terminal 100 may link the audio signal output path to the speaker thereof, and may selectively stop audio signal output to the earphone device 200.

As another example, in response to non-wearing of the earphone device 200, the mobile terminal 100 may pause execution of an application being executed and store associated information. When the earphone device 200 is worn again, the mobile terminal 100 may resume execution of the paused application with the stored information. An indicator to a paused application and a description on the paused state may be output on the display unit 140. The description on the paused state may indicate the time of pause of the application having been executed. For example, when playback of an audio or video file is paused, the point in time of pause may be indicated.

When the earphone device 200 is uninstalled from the earphone interface 170, a notification indicating uninstallation of the earphone device 200 may be temporarily output on the display unit 140 as indicated by indicia 1407. After a preset time, the notification may be removed from the display unit 140. Here, the mobile terminal 100 may link the audio signal output path to the speaker thereof.

Figure 15:
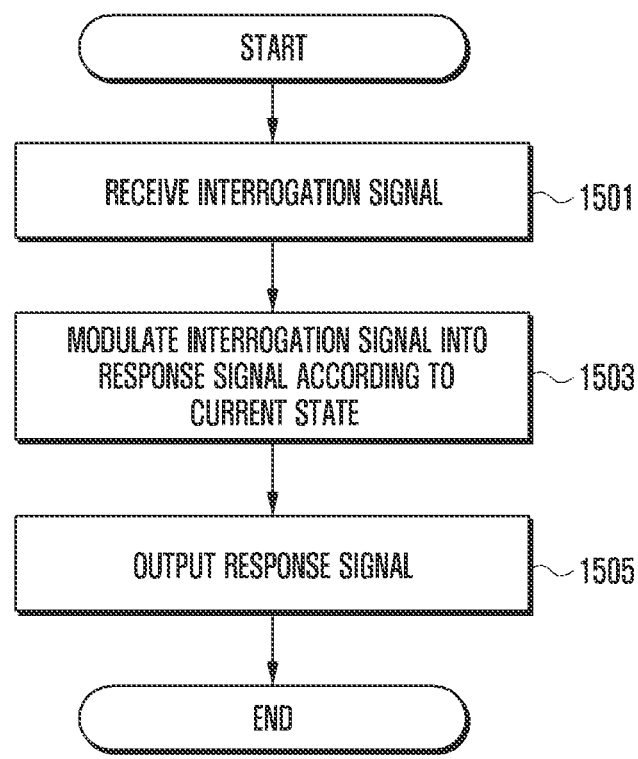
FIG. 15 illustrates earphone device control according to an embodiment of the present disclosure.

FIG. 15 illustrates earphone device control according to an embodiment of the present disclosure.

Referring to FIG. 15, the earphone device 200 receives an interrogation signal from the mobile terminal 100 at operation 1501. Here, when the non-powered sensor 210 of the earphone device 200 includes an antenna, the interrogation signal may be wirelessly received through the antenna. Alternatively, the non-powered sensor 210 of the earphone device 200 may receive the interrogation signal through a signal line connected to the earphone head. For example, the non-powered sensor 210 of the earphone device 200 may receive the interrogation signal through a ground line of the earphone head.

At operation 1503, the earphone device 200 modulates the interrogation signal into a response signal corresponding to at least one of the current states of the non-powered sensor 210. Here, physical properties of the non-powered sensor 210 may be altered first according to at least one of a temperature change and a pressure change, and the interrogation signal may be modulated into a response signal according to a change in the physical properties. When multiple non-powered sensors are utilized, modulation of the interrogation signal may include at least one of modulating the interrogation signal according to a temperature change of at least one non-powered sensor whose physical properties are changed, and modulating the interrogation signal according to a pressure change of at least one non-powered sensor whose physical properties are changed.

At operation 1505, the earphone device 200 outputs the response signal to the mobile terminal 100. With these operations of the earphone device operation procedure, the earphone device 200 may send a response signal based on its physical state change to the mobile terminal 100 having sent an interrogation signal. When the non-powered sensor 210 of the earphone device 200 has an antenna, it may wirelessly output the response signal through the antenna. The non-powered sensor 210 of the earphone device 200 may also output the response signal through a signal line or a ground line connected with the earphone head to the mobile terminal 100.

As described hereinabove, in the application control method, application control apparatus, and mobile terminal according to an embodiment of the present disclosure, functions of the mobile terminal are executed adaptively according to installation and wearing of the earphone device 200. For example, non-powered sensors 210 are utilized to determine whether the earphone device 200 is worn with minimized power consumption. In addition, the present disclosure may provide various information regarding situations of the wearer of the earphone device 200 such as a temperature change and pressure change.

Meanwhile, the mobile terminal 100 may further include various components according to design. For example, the mobile terminal 100 may further include a data communication interface based on wired and wireless communication, an Internet communication module for Internet access and communication, and the like. Although possible variations according to the trend of digital convergence are too numerous to enumerate, it should be apparent to those skilled in the art that the mobile terminal 100 may further include a unit comparable to the above-described units, and one unit of the mobile terminal 100 may be removed or replaced with another unit.

The mobile terminal 100 of the present disclosure may be any information and communication appliance or multimedia appliance, such as a mobile communication terminal based on communication protocols supporting various communication systems, a Portable Multimedia Player (PMP), a digital broadcast receiver, a Personal Digital Assistant (PDA), a music player like an MP3 player, a portable game console, a smartphone, a laptop computer, or a handheld computer.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for application control in a mobile terminal, the method comprising:
    detecting connection of earphones comprising a non-powered sensor for sensing earphone wearing;
    sending, upon detection of earphone connection, an interrogation signal comprising a preset reference wave to the sensor of the earphones;
    receiving a response signal comprising a reflected wave, corresponding to the interrogation signal, from the earphones;
    determining whether the earphones are worn by a user on a basis of comparing a reference value with a difference between the reference wave and the reflected wave; and
    controlling, when the earphones are not worn, to stop output of an audio signal to the earphones by an application being executed,
    wherein the reflected wave comprises a reflection of the interrogation signal modulated according to physical characteristics, corresponding to an external temperature or pressure, of the non-powered sensor.

2. The method of claim 1, wherein the sending of the interrogation signal comprises wirelessly sending the interrogation signal to the sensor having an antenna, and wherein the receiving of the response signal comprises receiving a response signal from the sensor through a ground line connected to the earphones.

3. The method of claim 1, wherein the sending of the interrogation signal comprises sending the interrogation signal to the sensor through a ground line connected to the earphones, and wherein the receiving of the response signal comprises receiving a response signal wirelessly sent by the sensor having an antenna.

4. The method of claim 2, wherein the determining of whether the earphones are worn comprises determining whether the difference between the reference wave and the reflected wave is greater than or equal to the reference value.

5. The method of claim 4, wherein the controlling of the application further comprises:
    stopping, upon detection of non-wearing of the earphones, execution of the application being executed and saving the application; and
    resuming, upon detection of wearing of the earphones, execution of the stopped application from the saved state.

6. The method of claim 4, wherein the controlling of the application comprises automatically placing, when a call making application is executed upon detection of wearing of the earphones, a call using a phone number.

7. The method of claim 6, wherein the controlling of the application comprises automatically executing, when the call making application operates a camera module upon detection of wearing of the earphones, a video call application.

8. The method of claim 4, wherein the controlling of the application comprises outputting, upon detection of non-wearing of the earphones, the audio signal to a speaker of the mobile terminal.

9. The method of claim 4, wherein the controlling of the application comprises adjusting, upon detection of wearing of the earphones, a volume of the audio signal output to the earphones according to an intensity of the response signal.

10. An apparatus for application control in a mobile terminal, the apparatus comprising:
    an earphone interface configured to detect connection of earphones comprising a non-powered sensor for sensing earphone wearing;
    a reader module configured to send an interrogation signal comprising a preset reference wave to the earphones and to receive a response signal comprising a reflected wave emitted by the non-powered sensor; and
    a control unit configured to perform a process of sending, upon detection of earphone connection, the interrogation signal to the sensor of the earphones, receiving the response signal corresponding to the interrogation signal, analyzing the response signal, determining whether the earphones are worn by a user on a basis of comparing a reference value with a difference between the reference wave and the reflected wave, and controlling, when the earphones are not worn, to stop output of an audio signal to the earphones by an application being executed,
    wherein the reflected wave comprises a reflection of the interrogation signal modulated according to physical characteristics, corresponding to an external temperature or pressure, of the non-powered sensor.

11. The apparatus of claim 10, wherein the reader module wirelessly sends the interrogation signal to the sensor having an antenna and receives the response signal from the sensor through a ground line of the earphone interface.

12. The apparatus of claim 10, wherein the earphone interface comprises:
    terminals connected to speakers of the earphones;
    a ground terminal connected to a ground line of the earphones; and a switch configured to selectively interconnect the ground terminal and the reader module or interconnect the ground terminal and a radio module.

13. The apparatus of claim 10, wherein the control unit determines earphone wearing according to whether the difference between the reference wave and the reflected wave is greater than or equal to the reference value.

14. The apparatus of claim 11, wherein the control unit stops, upon detection of non-wearing of the earphones, execution of an application being executed and saves the application, and resumes, upon detection of wearing of the earphones, execution of the stopped application from the saved state.

15. The apparatus of claim 10, wherein, when a call making application is executed upon detection of wearing of the earphones, the control unit automatically places a call using a phone number.

16. The apparatus of claim 10, wherein, when a call making application operates a camera module upon detection of wearing of the earphones, the control unit automatically executes a video call application.

17. The apparatus of claim 10, wherein the control unit outputs, upon detection of non-wearing of the earphones, the audio signal to a speaker of the mobile terminal.

18. The apparatus of claim 10, wherein the control unit adjusts, upon detection of wearing of the earphones, a volume of the audio signal output to the earphones according to an intensity of the response signal.

19. The apparatus of claim 10, wherein the control unit controls execution of various applications by use of the earphones capable of communicating with the mobile terminal.

20. An earphone device comprising:
   a head section configured to output an audio signal;
   a non-powered sensor comprising an antenna, arranged at the head section, connected between ground lines of the earphone device, and configured to receive an interrogation signal comprising a preset reference wave from an external device and to output a response signal comprising a reflected wave indicating wearing or non-wearing of the head section on the ear; and
   a case configured to enclose the non-powered sensor and head section,
   wherein the reflected wave comprises a reflection of the interrogation signal modulated according to physical characteristics, corresponding to an external temperature or pressure, of the non-powered sensor, and
   wherein the indicating of the wearing or non-wearing is according to a comparison of a reference level with a difference between the reference wave and the reflected wave.

21. The earphone device of claim 20, wherein the non-powered sensor comprises:
   a sensing part whose physical characteristics are altered according to at least one of a temperature change and a pressure change;
   a transponder configured to forward the interrogation signal to the sensing part and to send the response signal comprising the reflected wave modulated according to the physical characteristics; and
   at least one of the antenna and a signal line configured to receive the interrogation signal and to forward the same to the transponder, and to provide the response signal to an external mobile terminal.

22. The earphone device of claim 21, wherein the sensing part senses a temperature change in response to the interrogation signal and outputs the sensed temperature change in the response signal.

23. The earphone device of claim 21, wherein the sensing part senses a pressure change in response to the interrogation signal and outputs the sensed pressure change in the response signal.

24. An application control system comprising an earphone device and a mobile terminal, wherein the earphone device comprises:
   a head section configured to output an audio signal;
   a non-powered sensor comprising an antenna, arranged at the head section, connected between ground lines of the earphone device, configured to receive an interrogation signal comprising a preset reference wave from an external device, and to output a response signal comprising a reflected wave indicating wearing or non-wearing of the head section on the ear; and
   a case configured to enclose the non-powered sensor and head section,
   wherein the mobile terminal comprises:
      an earphone interface configured to detect connection of the earphone device;
      a reader module configured to send the interrogation signal to the earphone device and to receive the response signal emitted by the non-powered sensor of the earphone device; and
      a control unit configured to perform a process of sending, upon detection of earphone connection, the interrogation signal to the sensor of the earphone device, receiving the response signal corresponding to the interrogation signal, analyzing the response signal, and controlling, when the earphone device is not worn, to stop output of an audio signal to the earphone device by an application being executed,
   wherein the analyzing comprises determining the indication of wearing or non-wearing on a basis of comparing a reference value with a difference between the reference wave and the reflected wave, and
   wherein the reflected wave comprises a reflection of the interrogation signal modulated according to physical characteristics, corresponding to an external temperature or pressure, of the non-powered sensor.

25. The application control system of claim 24, wherein the non-powered sensor of the earphone device comprises:
   a sensing part whose physical characteristics are altered according to at least one of a temperature change and a pressure change;
   a transponder configured to forward the interrogation signal to the sensing part and to send the response signal comprising the reflected wave modulated according to the physical characteristics; and
   at least one of the antenna and a signal line configured to receive the interrogation signal and to forward the interrogation signal to the transponder, and to provide the response signal to the mobile terminal.

26. The method of claim 1, further comprising automatically initiating playback of a preset file comprising an audio signal according to whether the earphones are worn.

27. The method of claim 1, further comprising automatically executing an application supporting broadcast reception according to whether the earphones are worn.

28. The method of claim 1, further comprising automatically initiating recording of data produced by the application being executed according to whether the earphones are worn.

29. The method of claim 6, further comprising automatically terminating the call when the earphones are not worn.

* * * * *